US010996849B2

(12) United States Patent
Nagasaka

(10) Patent No.: US 10,996,849 B2
(45) Date of Patent: May 4, 2021

(54) ELECTRONIC DEVICE, CONTROL METHOD, AND MEDIUM FOR ALLOCATING CONTENTS TO TOUCH SCREEN EDGE SOFTWARE KEYS

(71) Applicant: KYOCERA Corporation, Kyoto (JP)

(72) Inventor: Yushi Nagasaka, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 61 days.

(21) Appl. No.: 15/911,484

(22) Filed: Mar. 5, 2018

(65) Prior Publication Data

US 2018/0253229 A1    Sep. 6, 2018

(30) Foreign Application Priority Data

Mar. 6, 2017  (JP) .............................. JP2017-041821

(51) Int. Cl.
*G06F 9/48*       (2006.01)
*G06F 3/0488*    (2013.01)
*G06F 3/041*     (2006.01)
*G06F 16/95*     (2019.01)

(52) U.S. Cl.
CPC ........ *G06F 3/04886* (2013.01); *G06F 3/0412* (2013.01); *G06F 16/95* (2019.01)

(58) Field of Classification Search
CPC .. G06F 3/04886; G06F 3/0412; G06F 3/0416; G06F 16/95
See application file for complete search history.

(56) References Cited

U.S. PATENT DOCUMENTS

| | | | |
|---|---|---|---|
| 6,643,824 B1* | 11/2003 | Bates ................... | G06F 3/0481 715/205 |
| 6,697,799 B1* | 2/2004 | Neal ..................... | G06F 16/951 |
| 8,519,963 B2 | 8/2013 | Kocienda et al. | |
| 8,977,982 B1* | 3/2015 | Amacker ............... | G06F 3/014 715/787 |
| 10,586,277 B2* | 3/2020 | Johnson ................ | G06Q 10/10 |
| 2006/0212829 A1 | 9/2006 | Yahiro et al. | |
| 2012/0124515 A1* | 5/2012 | Li ........................ | G06F 3/0482 715/808 |
| 2013/0141367 A1 | 6/2013 | Kawase et al. | |
| 2014/0365867 A1* | 12/2014 | Kawasaki ............. | G06F 16/958 715/234 |

FOREIGN PATENT DOCUMENTS

| | | |
|---|---|---|
| JP | 200572922 A | 3/2005 |
| JP | 2006260266 A | 9/2006 |
| JP | 2013-117797 A | 6/2013 |
| JP | 2015156087 A | 8/2015 |
| WO | 2008/086302 A1 | 7/2008 |

* cited by examiner

*Primary Examiner* — Jennifer N To
*Assistant Examiner* — K C Chen
(74) *Attorney, Agent, or Firm* — Hauptman Ham, LLP

(57) ABSTRACT

An electronic device includes a touch screen, one or a plurality of software keys arranged along an edge of the touch screen, a storage configured to store a rule that classifies elements included in contents, and a controller configured to classify the elements included in the contents on the basis of the rule to allocate the classified element into one or a plurality of software keys.

9 Claims, 25 Drawing Sheets

FIG.2

| KEY CONFIGU-RATION | | ALLOCATION FUNCTION | ALLOCATION PARTITION/ELEMENT (FIRST ROUND) | ALLOCATION PARTITION/ELEMENT (SECOND ROUND) | ALLOCATION PARTITION/ELEMENT (THIRD ROUND) | ALLOCATION PARTITION/ELEMENT (FOURTH ROUND) |
|---|---|---|---|---|---|---|
| FIRST SOFTKEY GROUP G1 | $30a_1$ | RETURN ONE STEP | - | - | - | - |
| | $30a_2$ | - | ADDRESS | TEXT | - | - |
| | $30a_3$ | - | MENU | - | - | - |
| | $30a_4$ | - | LINK | - | - | - |
| | $30a_5$ | PROCEED ONE STEP | - | - | - | - |
| SECOND SOFTKEY GROUP G2 | $30b_1$ | RETURN ONE STEP | - | - | - | - |
| | $30b_2$ | - | - | TEXT e2-(8) | - | - |
| | $30b_3$ | - | - | MENU e2-(7) | - | - |
| | $30b_4$ | - | - | MENU e2-(6) | - | - |
| | $30b_5$ | - | - | LINK e2-(5) | - | - |
| | $30b_6$ | - | - | LINK e2-(4) | MENU e2-(12) | - |
| | $30b_7$ | - | MENU e1-(3) | LINK e2-(3) | TEXT e2-(11) | - |
| | $30b_8$ | - | MENU e1-(2) | LINK e2-(2) | MENU e2-(10) | MENU e3-(2) |
| | $30b_9$ | - | ADDRESS e1-(1) | LINK e2-(1) | TEXT e2-(9) | MENU e3-(1) |
| | $30b_{10}$ | PROCEED ONE STEP | - | - | - | - |

| TARGET SCREEN | PARTITION | CLASSIFICATION ELEMENT | PRIORITY |
|---|---|---|---|
| WEB SCREEN | ADDRESS | ADDRESS BAR | 3 |
| | MENU | MENU PART | 4 |
| | LINK | LINK PART | 2 |
| | TEXT | IN-PAGE TEXT | 1 |
| | IMAGE | IN-PAGE IMAGE | 5 |
| TABLE CALCULATION SCREEN | MENU | MENU PART | 3 |
| | WORKSHEET | WORKSHEET | 2 |
| | GRAPH | GRAPHIC CHART | 4 |
| | TEXT | IN-WORKSHEET (CELL) TEXT | 1 |
| DOCUMENT EDITING SCREEN | MENU | MENU PART | 3 |
| | INPUT AREA | DOCUMENT INPUT AREA | 2 |
| | TABLE | GRAPHIC CHART | 4 |
| | TEXT | IN-DOCUMENT INPUT AREA TEXT | 1 |
| ⋮ | ⋮ | ⋮ | ⋮ |

FIG.4

| USER ATTRIBUTE | PRIORITY OF KEY ALLOCATION TARGET |
|---|---|
| ATTRIBUTE 1 | ALL PRIORITIES |
| ATTRIBUTE 2 | PRIORITIES 1 TO 3 |
| ATTRIBUTE 3 | PRIORITY 1 |

FIG.5

| SETTING OF USER ATTRIBUTE |
|---|
| ATTRIBUTE 1 |

FIG.24
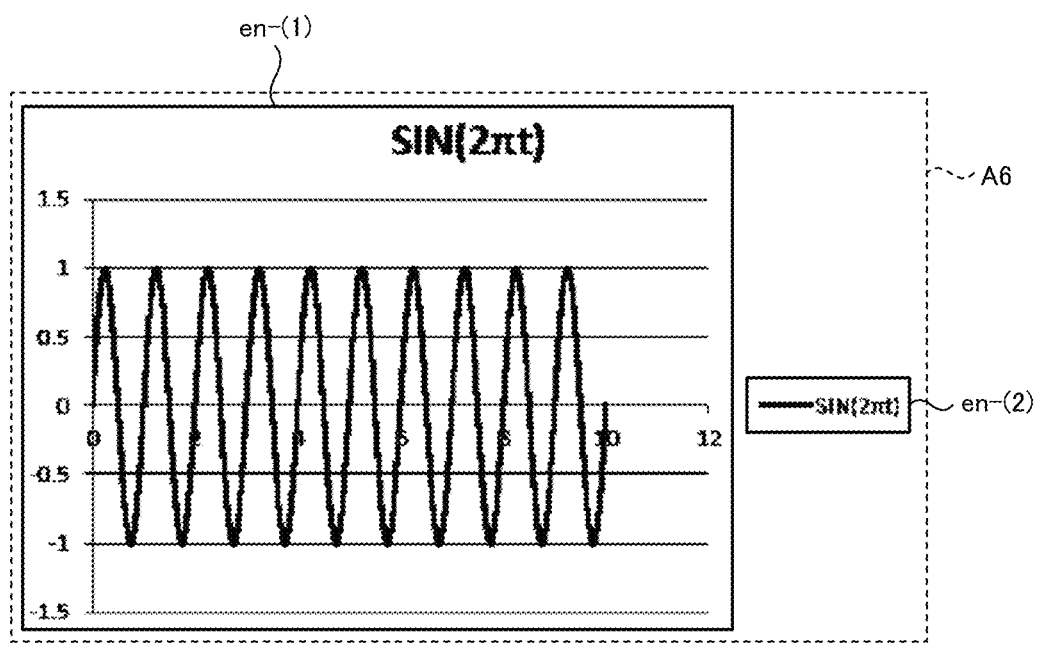
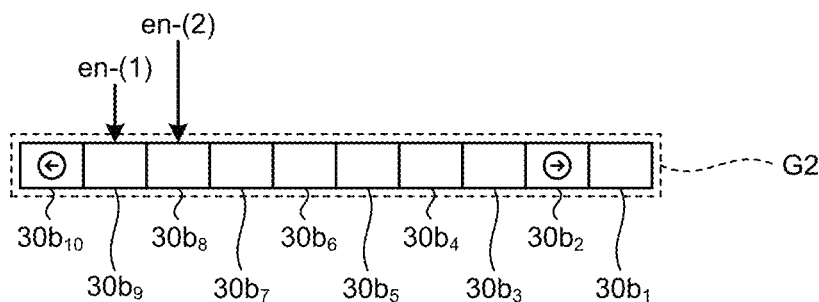

FIG.25

| | KEY CONFIGU-RATION | ALLOCATION FUNCTION | ALLOCATION PARTITION/ ELEMENT (FIRST ROUND) | ALLOCATION PARTITION/ ELEMENT (SECOND ROUND) | ... | ALLOCATION PARTITION/ ELEMENT (n-a ROUND) | ... | ALLOCATION PARTITION/ ELEMENT (n-b ROUND) | ... | ALLOCATION PARTITION/ ELEMENT (n ROUND) |
|---|---|---|---|---|---|---|---|---|---|---|
| FIRST SOFTKEY GROUP G1 | 30a1 | RETURN ONE STEP | - | - | ... | - | ... | - | ... | - |
| | 30a2 | - | MENU | TEXT | ... | LINE (1) | ... | - | ... | - |
| | 30a3 | - | WORKSHEET | - | ... | LINE (2) | ... | - | ... | - |
| | 30a4 | - | GRAPH | - | ... | LINE (3) | ... | - | ... | - |
| | 30a5 | PROCEED ONE STEP | - | - | ... | - | ... | - | ... | - |
| | 30b1 | UTILITY | - | - | ... | - | ... | - | ... | - |
| | 30b2 | RETURN ONE STEP | - | - | ... | - | ... | - | ... | - |
| SECOND SOFTKEY GROUP G2 | 30b3 | - | MENU e107 | MENU e114 | ... | COLUMN (G) | ... | TEXT e(n-b)-(7) | ... | - |
| | 30b4 | - | MENU e106 | MENU e113 | ... | COLUMN (F) | ... | TEXT e(n-b)-(6) | ... | - |
| | 30b5 | - | MENU e105 | MENU e112 | ... | COLUMN (E) | ... | TEXT e(n-b)-(5) | ... | - |
| | 30b6 | - | MENU e104 | MENU e111 | ... | COLUMN (D) | ... | TEXT e(n-b)-(4) | ... | - |
| | 30b7 | - | MENU e103 | MENU e110 | ... | COLUMN (C) | ... | TEXT e(n-b)-(3) | ... | - |
| | 30b8 | - | MENU e102 | MENU e109 | ... | COLUMN (B) | ... | TEXT e(n-b)-(2) | ... | GRAPH en-(2) |
| | 30b9 | - | MENU e101 | MENU e108 | ... | COLUMN (A) | ... | TEXT e(n-b)-(1) | ... | GRAPH en-(1) |
| | 30b10 | PROCEED ONE STEP | - | - | ... | - | ... | - | ... | - |

9C

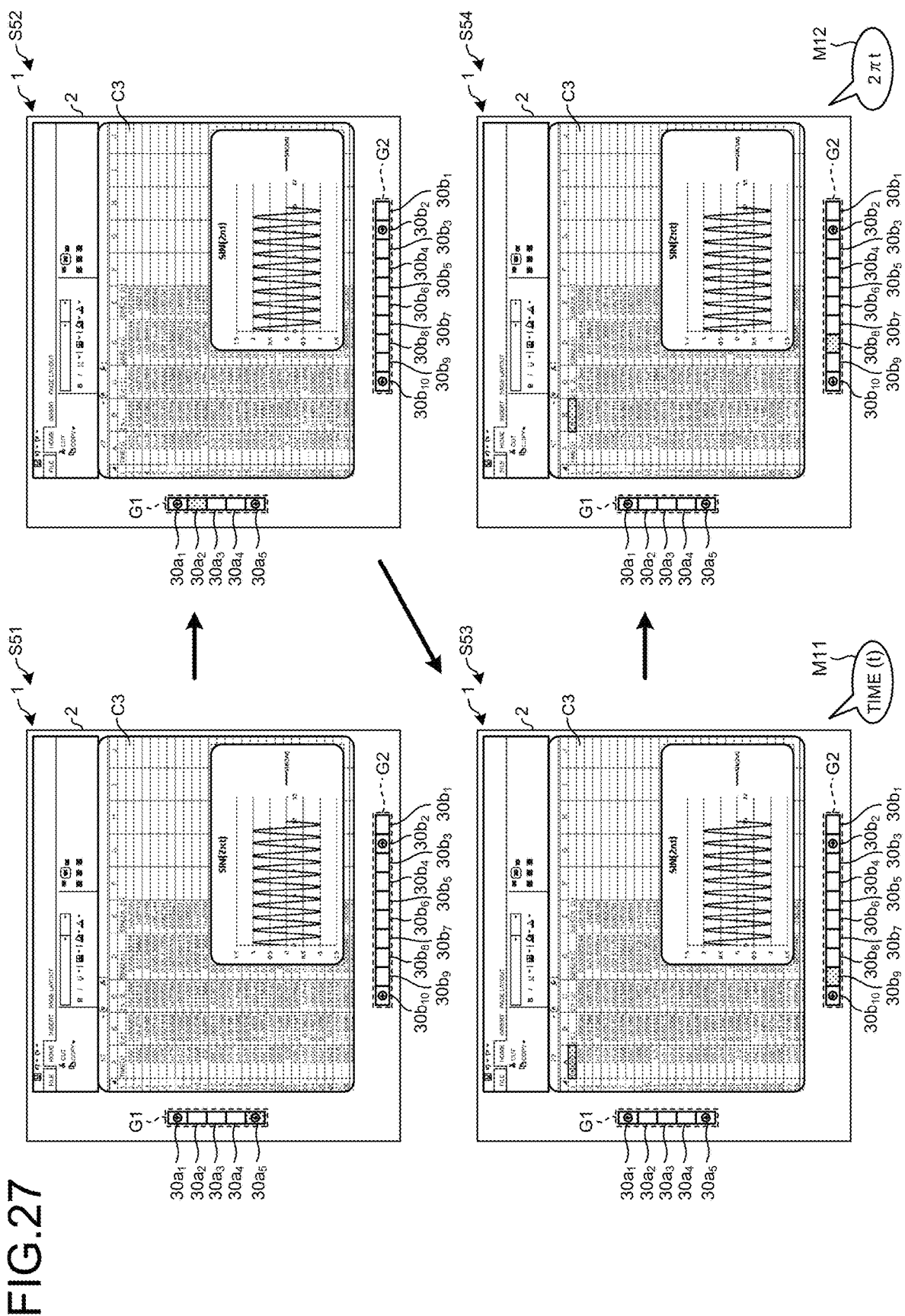

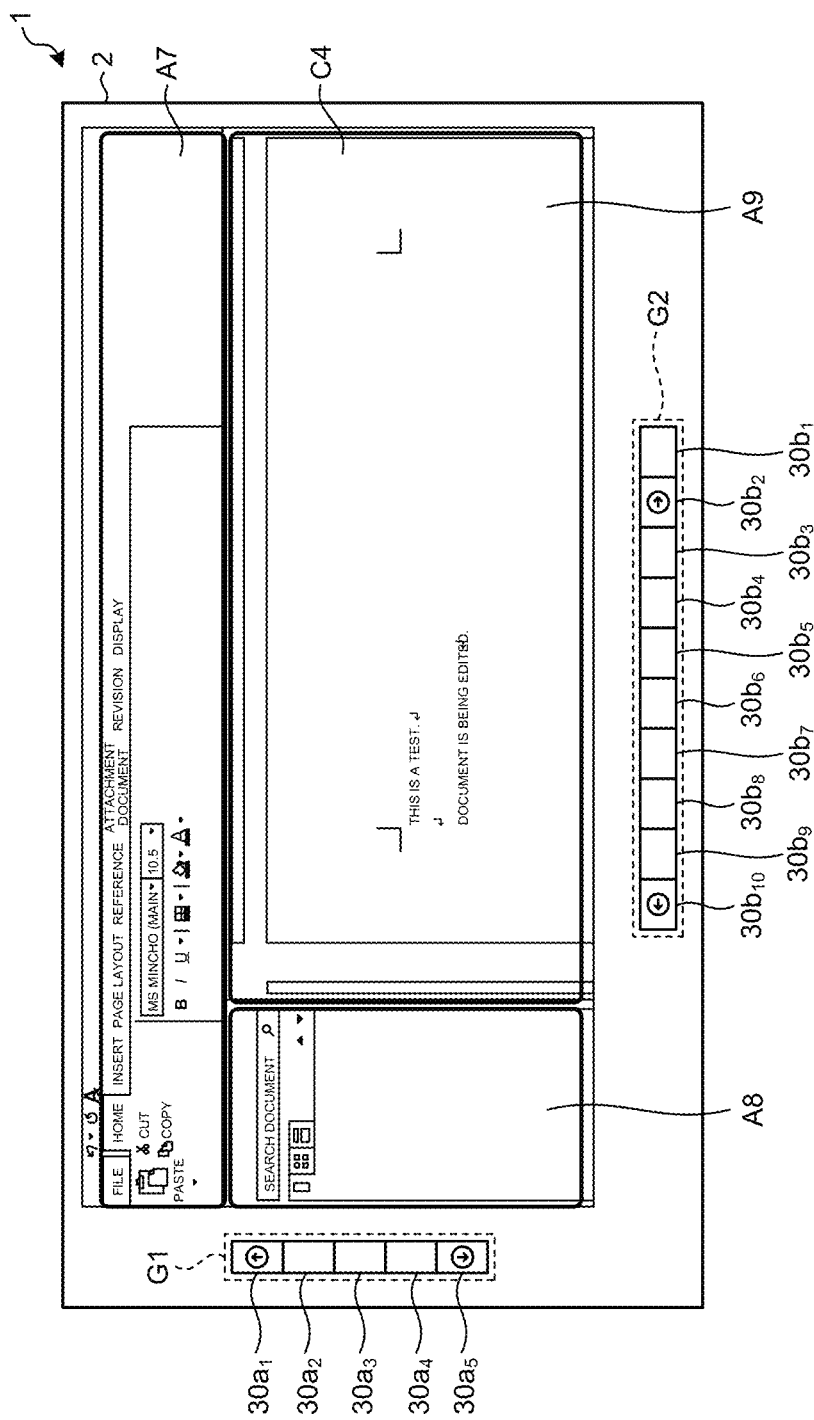

ELECTRONIC DEVICE, CONTROL METHOD, AND MEDIUM FOR ALLOCATING CONTENTS TO TOUCH SCREEN EDGE SOFTWARE KEYS

CROSS-REFERENCE TO RELATED APPLICATION(S)

The present application claims priority under 35 U.S.C. § 119 to Japanese Patent Application No. 2017-041821, filed on Mar. 6, 2017, entitled "ELECTRONIC DEVICE, CONTROL METHOD, AND CONTROL PROGRAM". The content of which is incorporated by reference herein in its entirety.

FIELD

The present application relates to an electronic device, a control method, and a control program.

BACKGROUND

A physical key, a touch screen, and the like are mounted on an electronic device. For example, there is an electronic device executing various functions according to an operation detected through a physical key and a touch screen.

SUMMARY

An electronic device according to one aspect includes a touch screen, one or a plurality of software keys arranged along an edge of the touch screen, a storage configured to store a rule that classifies elements included in contents, and a controller configured to classify the elements included in the contents on the basis of the rule to allocate the classified element into one or a plurality of software keys.

A control method according to one aspect of an electronic device including a touch screen, one or a plurality of software keys arranged in a first column along an edge of the touch screen, and a storage configured to store a rule that classifies elements included in contents, includes classifying the elements included in the contents on the basis of the rule to allocate the classified element into one or a plurality of software keys.

A non-transitory storage medium that stores a control program according to one aspect causes, when executed by an electronic device including a touch screen, one or a plurality of software keys arranged in a first column along an edge of the touch screen, and a storage configured to store a rule that classifies elements included in contents, the electronic device to execute classifying the elements included in the contents on the basis of the rule to allocate the classified element into one or a plurality of software keys.

BRIEF DESCRIPTION OF THE DRAWINGS

FIG. 2 is a diagram illustrating an example of key data according to some embodiments;

FIG. 3 is a diagram illustrating an example of an element classification rule according to some embodiments;

FIG. 4 is a diagram illustrating an example of a user attribute-corresponding priority table according to some embodiments;

FIG. 5 is a diagram illustrating an example of user attribute data according to some embodiments;

FIG. 24 is a diagram illustrating the outline of the allocation of the elements included in the table calculation screen with respect to the softkey, according to some embodiments;

FIG. 25 is a diagram illustrating another example of the key data according to some embodiments;

FIG. 27 is a diagram illustrating another example of the operation of the electronic device according to some embodiments; and FIG. 28 is a diagram illustrating an outline of allocation of elements included in a document editing screen with respect to a softkey, according to some embodiments.

DETAILED DESCRIPTION

A plurality of embodiments for implementing electronic device, a control method, and a control program according to the application, will be described in detail with reference to the drawings. In the electronic device of the related art, there may be a room for improvement in operability of various contents such as a character, a diagram, a sound, an image, a video, and a web page configured of a combination thereof, which are displayed on a display.

The electronic device according to the application may be a device such as a smart phone, a mobile phone, a tablet, a mobile computer, a media player, an electronic book reader, a navigator, a wearable device, or a game console.

Figure 1:
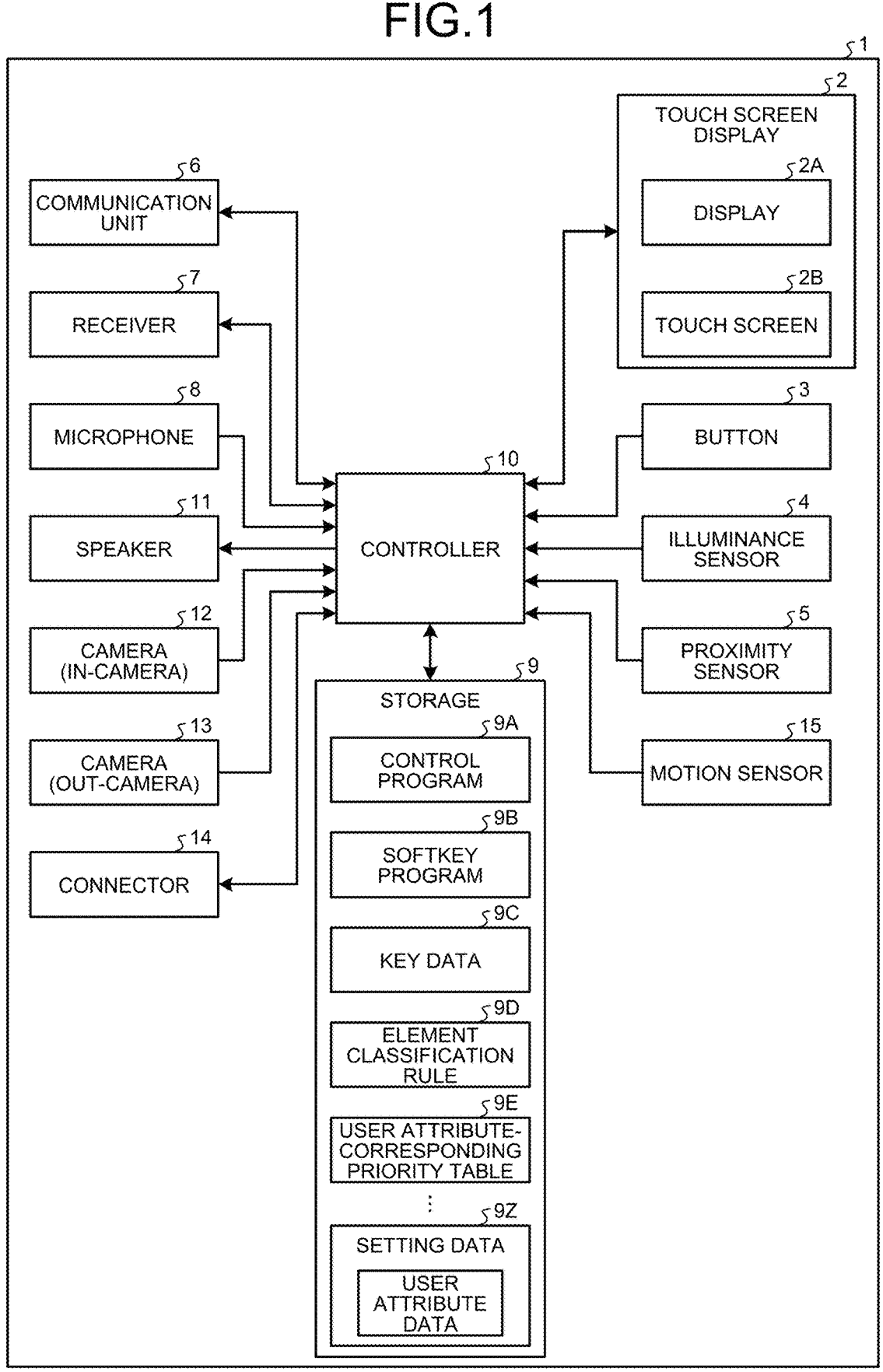
FIG. 1 is a block diagram illustrating an example of a functional configuration of an electronic device according to embodiments.

FIG. 1 is a block diagram illustrating an example of a functional configuration of an electronic device according to embodiments. In the following description, the same reference numerals are applied to the same constituents. In the following description, the contents are an aggregate of digital data configured of a character, a diagram, a sound, an image, a video, and a combination thereof, and an aggregate of digital data processed by software such as an application, as represented by a web page or the like. The contents include a screen which is displayed on a display or the like in a state of being configured of a character, a diagram, a sound, an image, a video, and a combination thereof, and a screen which is displayed on a display or the like according to execution of software such as an application, as represented by a screen of a web page (hereinafter, a web screen), or the like. In some embodiments described below, the web screen, and the screen which is displayed on the display or the like according to the execution of the software, will be described as an example of the contents.

As illustrated in FIG. 1, an electronic device 1 includes a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, and a motion sensor 15.

The touch screen display 2 includes a display 2A and a touch screen 2B. The display 2A and the touch screen 2B, for example, may be positioned to overlap with each other, may be positioned to be parallel to each other, or may be positioned to be separated from each other. In a case where the display 2A and the touch screen 2B are positioned to overlap with each other, for example, one or a plurality of sides of the display 2A may not be along any side of the touch screen 2B.

The display 2A includes a display device such as a liquid crystal display (LCD), an organic electro-luminescence display (an organic EL display, OELD), or an inorganic electro-luminescence display (an inorganic EL display, IELD). The display 2A displays an object such as a character, an image, a code, and a diagram, on the screen. The screen including the object to be displayed on the display 2A includes a screen referred to as a lock screen, a screen referred to as a home screen, and an application screen which is displayed during execution of an application. The home screen is referred to as a desktop, an standby screen, an idle screen, a standard screen, an application list screen, or a launcher screen.

The touch screen 2B detects the contact or the proximity of a finger, a pen, a stylus pen, or the like with respect to the touch screen 2B. The touch screen 2B is capable of detecting a position on the touch screen 2B when a plurality of fingers, a pen, a stylus pen, or the like is in contact with or in proximity to the touch screen 2B. In the following description, a position where the plurality of fingers, the pen, the stylus pen, or the like, which are detected by the touch screen 2B are in contact with or in proximity to the touch screen 2B, will be represented as a "detection position". The touch screen 2B notifies the controller 10 of the contact or the proximity of the finger with respect to the touch screen 2B along with the detection position. The touch screen 2B may notify the controller 10 of the detection of the contact or the proximity after the notification of the detection position. An operation performed by the touch screen 2B can be executed by the touch screen display 2 including the touch screen 2B. In other words, the operation performed by the touch screen 2B may be performed by the touch screen display 2.

The controller 10 distinguishes types of gestures on the basis of at least one of the contact or the proximity detected by the touch screen 2B, the detection position, a change in the detection position, time during which the contact or the proximity is continued, an interval at which the contact or the proximity is detected, and the number of times at which the contact is detected. An operation performed by the controller 10 can be executed by the electronic device 1 including the controller 10. In other words, the operation performed by the controller 10 may be performed by the electronic device 1. The gesture is an operation which is performed with respect to the touch screen 2B by using the finger. The operation performed with respect to the touch screen 2B may be performed by the touch screen display 2 including the touch screen 2B. Examples of the gestures distinguished by the controller 10 through the touch screen 2B, include, but are not limited to touch, long touch, release, swipe, tap, double tap, long tap, drag, flick, pinch in, and pinch out.

A detecting scheme of the touch screen 2B may be an arbitrary scheme such as an electrostatic capacitance scheme, a resistance film scheme, a surface elastic wave scheme, an infrared ray scheme, and a load detecting scheme.

The button 3 receives operation input from a user.

The illuminance sensor 4 detects an illuminance. The illuminance is a value of a light flux incident on a unit area of a measurement surface of the illuminance sensor 4. The illuminance sensor 4, for example, is used for adjusting a brightness of the display 2A.

The proximity sensor 5 detects the presence or absence of the adjacent object in a non-contact manner. The proximity sensor 5 detects the presence or absence of the object on the basis of a change in a magnetic field, a change in feedback time of a reflective wave of an ultrasonic wave, or the like. The proximity sensor 5, for example, detects that the display 2A is close to a face. The illuminance sensor 4 and the proximity sensor 5 may be configured as one sensor. The illuminance sensor 4 may be used as a proximity sensor.

The communication unit 6 performs communication in a wireless manner. Examples of a wireless communication standard supported by the communication unit 6 include a communication standard of a cellular phone of 2G, 3G, 4G, 5G, or the like, and a near field wireless communication standard. Examples of the communication standard of the cellular phone include long term evolution (LTE), wideband code division multiple access (W-CDMA), worldwide interoperability for microwave access (WiMAX (registered trademark)), CDMA2000, personal digital cellular (PDC), global system for mobile communications (GSM (registered trademark)), personal handy-phone system (PHS), and the like. Examples of the near field wireless communication standard include IEEE802.11, Bluetooth (registered trademark), infrared data association (IrDA), near field communication (NFC), wireless personal area network (WPAN), and the like. Examples of a communication standard of WPAN include ZigBee (registered trademark). The communication unit 6 may support one or a plurality of communication standards described above.

The receiver 7 outputs a sound signal transmitted from the controller 10 as a sound. The receiver 7, for example, is capable of outputting a sound of a video which is played on the electronic device 1, a sound of music, and a voice of the other person at the time of a telephone call. The microphone 8 converts a voice of a user, or the like, to be input, into a sound signal, and transmits the sound signal to the controller 10.

The storage 9 stores a program and data. The storage 9 may be used as a working area which temporarily stores a processing result of the controller 10. The storage 9 may include an arbitrary non-transitory storage medium such as a semiconductor storage medium and a magnetic storage medium. The storage 9 may include a plurality of types of storage mediums. The storage 9 may include a combination of a storage medium such as a memory card, an optical disk, or a magnetooptical disk, and a reading device of the storage medium. The storage 9 may include a storage device which is used as a temporary storage area such as a random access memory (RAM).

The program stored in the storage 9 includes an application to be executed in the foreground or the background, and a basic program (not illustrated) supporting an operation of the application. In a case where the application, for example, is executed in the foreground, a screen relevant to the application is displayed on the display 2A. Examples of the basic program include an OS. The program may be installed in the storage 9 through the wireless communication of the communication unit 6 or the non-transitory storage medium.

The storage 9 is capable of storing a control program 9A, a softkey program 9B, a key data 9C, an element classification rule 9D, a user attribute-corresponding priority table 9E, a setting data 9Z, and the like. When various functions are provided, the control program 9A is capable of being in cooperation with the softkey program 9B stored in the electronic device 1 and various applications. The control program 9A may be in cooperation with a cloud storage through the communication unit 6, and may access a file and data stored in the cloud storage. The cloud storage may store a part or all of the programs and the data items stored in the storage 9.

The control program 9A is capable of providing each of functions for realizing processing relevant to various operations of the electronic device 1. The function provided by the control program 9A includes a function of adjusting the brightness of the display 2A, on the basis of a detection result of the illuminance sensor 4. The function provided by the control program 9A includes a function of allowing an operation with respect to the touch screen 2B to be invalid, on the basis of a detection result of the proximity sensor 5. The function provided by the control program 9A includes a function of allowing a telephone call to be realized by controlling the communication unit 6, the receiver 7, the microphone 8, and the like. The function provided by the control program 9A includes a function of controlling imaging processing of the camera 12 and the camera 13. The function provided by the control program 9A includes a function of controlling communication with respect to the external device which is connected thereto through the connector 14. The function provided by the control program 9A includes a function of performing various controls such as modifying information to be displayed on the display 2A, according to the gestures distinguished on the basis of a detection result of the touch screen 2B. The function provided by the control program 9A includes a function of detecting movement, suspension, or the like of the user who carries the electronic device 1, on the basis of a detection result of the motion sensor 15.

The function provided by the control program 9A includes a function relevant to an operation of the contents, and the like. The contents are an aggregate of digital data configured of a character, a diagram, a sound, an image, a video, and a combination thereof, and an aggregate of digital data processed by software such as an application, as represented by a web page or the like. The contents include a screen which is displayed on a display in a state of being configured of a character, a diagram, a sound, an image, a video, and a combination thereof, and a screen which is displayed on a display or the like according to execution of software such as an application, as represented by a screen of a web page (hereinafter, a web screen), or the like. Examples of the function include, but are not limited to a function for allowing the electronic device 1 to perform reduced display with respect to the contents to be displayed on the touch screen display 2 at a predetermined magnification in a predetermined condition. Various conditions such as the case of receiving an operation of performing reduced display with respect to the contents from the user, a case where a given length of time elapses after the contents are displayed on the touch screen display 2, or the case of modifying the attitude of the electronic device 1 such that a display aspect of the contents is changed from a vertically long state to a horizontally long state, can be adopted as the predetermined condition. An arbitrary magnification can be adopted as the predetermined magnification. The function includes a function for realizing processing of displaying a softkey interface including a software key (hereinafter, suitably referred to as a "softkey") in a blank area formed on the touch screen display 2 by allowing, for example, the electronic device 1 to perform the reduced display with respect to the contents, in cooperation with the softkey program 9B. Examples of the function include a function for realizing processing of allowing the electronic device 1 to classify elements included in the contents to be displayed on the touch screen display 2, on the basis of the element classification rule 9D, and to allocate the classified element to one or a plurality of softkeys.

Examples of the function relevant to the operation of the contents, and the like, provided by the control program 9A include a function for realizing processing of allowing the electronic device 1 to set the contents to be displayed on the touch screen display 2 in a predetermined area on the touch screen display 2, and to allocate the set area to any softkey of the first softkey group. Examples of the function include a function for realizing processing of allowing the electronic device 1 to classify elements of the contents included in an area corresponding to a softkey of which an operation is detected, on the basis of the element classification rule 9D, in a case where the operation of the softkey of the first softkey group is detected. The function includes a function for realizing processing of allowing the electronic device 1 to sort an element appropriate to a priority which corresponds to the user attribute data from the elements classified on the basis of the element classification rule 9D, with reference to a setting value of the user attribute (hereinafter, user attribute data) and user attribute-corresponding priority table 9E in the setting data 9Z described below. That is, in a case where a range of the priority corresponding to the user attribute data is priorities 1 to 3, only elements appropriate to the priorities 1 to 3 are sorted from the elements classified on the basis of the element classification rule 9D. Examples of the function include a function for realizing processing of allowing the electronic device 1 to allocate the element sorted on the basis of the user attribute data to any softkey of the second softkey group. Examples of the function include a function for realizing processing of allowing the electronic device 1 to redundantly allocate different elements with respect to the same softkey, according to a pattern set in advance, in a case where the number of elements of the contents is greater than the number of softkeys. Examples of the function include a function for realizing processing of allowing the electronic device 1 to set a partition for enabling user selection to be collectively performed with respect to each element sorted on the basis of the user attribute data element, and to allocate the set partition to the softkey of the first softkey group. For example, in a case where an address bar, a menu part, a link part, an in-page text, and an in-page image are classified as the element included in the contents, the electronic device 1 is capable of setting "address" as a partition corresponding to the address bar, "menu" as a partition corresponding to the menu part, "link" as a partition corresponding to the link part, "text" as a partition corresponding to the in-page text, and "image" as a partition corresponding to the in-page image, respectively, and of allocating the partitions to the softkeys of the first softkey group, respectively.

Examples of the function relevant to the operation of the contents, and the like, provided by the control program 9A include a function for realizing processing of allowing the electronic device 1 to output a sound corresponding to the partition or the element which is allocated to the softkey of which the operation is detected. In a case where "address bar", which is the element of the web screen, is allocated to the softkey of which the operation is detected, the electronic device 1 is capable of realizing processing of outputting a sound reading out an address described on the address bar. In a case where "address" is allocated to the softkey of which the operation is detected, as the partition corresponding to the element of the web screen, the electronic device 1 is capable of realizing processing of outputting a sound for providing notification that "address" is allocated to the softkey of which the operation is detected, as the partition corresponding to the element. In a case where "menu part", which is the element of the web screen, is allocated to the softkey of which the operation is detected, the electronic device 1 is capable of realizing processing of outputting a sound reading out the effect that it is the menu, the contents of the menu, and the like. In a case where "menu" is allocated to the softkey of which the operation is detected, as the partition corresponding to the element of the web screen, the electronic device 1 is capable of realizing processing of outputting a sound for providing notification that "menu" is allocated to the softkey of which the operation is detected, as the partition corresponding to the element. In a case where "in-page text", which is the element of the web screen, is allocated to the softkey of which the operation is detected, the electronic device 1 is capable of realizing processing of outputting a sound reading out the contents described on the text. In a case where "text" is allocated to the softkey of which the operation is detected, as the partition corresponding to the element of the web screen, the electronic device 1 is capable of realizing processing of outputting a sound for providing notification that "text" is allocated to the softkey of which the operation is detected, as the partition corresponding to the element. In a case where "link part", which is the element of the web screen, is allocated to the softkey of which the operation is detected, the electronic device 1 is capable of realizing processing of outputting a sound reading out the contents described on the link. In a case where "link" is allocated to the softkey of which the operation is detected, as the partition corresponding to the element of the web screen, the electronic device 1 is capable of realizing processing of outputting a sound for providing notification that "link" is allocated to the softkey of which the operation is detected, as the partition corresponding to the element. In a case where "in-page image", which is the element of the web screen, is allocated to the softkey of which the operation is detected, the electronic device 1 is capable of realizing processing of outputting a sound reading out an ID applied to the image. In a case where "image" is allocated to the softkey of which the operation is detected, as the partition corresponding to the element of the web screen, the electronic device 1 is capable of realizing processing of outputting a sound for providing notification that "image" is allocated to the softkey of which the operation is detected, as the partition corresponding to the element.

The softkey program 9B is capable of providing a function for allowing the electronic device 1 to realize processing relevant to the operation input through the softkey. The function provided by the softkey program 9B includes a function for realizing processing of allowing the electronic device 1 to display a softkey interface including one or a plurality of softkeys arranged along an edge of the touch screen display 2, on the touch screen display 2. The function provided by the softkey program 9B includes a function for realizing processing of allowing the electronic device 1 to display a softkey interface including the first softkey group including a plurality of softkeys arranged in a first column along the edge of the touch screen display 2, and the second softkey group including a plurality of softkeys arranged in a second column along the edge of the touch screen display 2, on the touch screen display 2. The softkey interface provided by the softkey program 9B is loaded on the touch screen display 2, in a configuration based on the key data 9C.

The key data 9C includes data for the softkey program 9B to configure the softkey interface. For example, the key data 9C includes data for determining the number of softkey groups, an arrangement position of the softkey group, the number of softkeys configuring the softkey group, and the like. The key data 9C includes manage information of the element and the partition of the contents allocated to the softkey. The manage information is referred to when processing corresponding to the operated softkey (for example, outputting a sound reading out the contents of the element or the partition, and the like) is executed.

FIG. 2 is a diagram illustrating an example of the key data 9C according to some embodiments. As exemplified in FIG. 2, the key data 9C includes data indicating a key configuration of the softkey configuring the softkey group, an allocation function with respect to the softkey, and an allocation partition or an allocation element with respect to the softkey, for each of the softkey groups. In the example illustrated in FIG. 2, a key configuration corresponding to a first softkey group G1 is formed of five softkeys of "$30a_1$ to $30a_5$". In the example illustrated in FIG. 2, an operation function of "return one step" is allocated to the softkey $30a_1$, and an operation function of "proceed one step" is allocated to the softkey $30a_5$. In the example illustrated in FIG. 2, the partitions of "address", "menu", and "link" are allocated to the softkeys $30a_2$ to $30a_4$, as a first round of the allocation partition. In the example illustrated in FIG. 2, there is allocation with respect to the softkey configuring the first softkey group G1 after a second round, as the allocation partition. That is, as illustrated in FIG. 2, the partition of "text" is allocated to the softkey $30a_2$, as a second round of the allocation partition. In the example illustrated in FIG. 2, a key configuration corresponding to a second softkey group G2 is formed of ten softkeys of "$30b_1$ to $30b_{10}$". In the example illustrated in FIG. 2, an operation function of "return one step" is allocated to the softkey $30b_1$, and an operation function of "proceed one step" is allocated to the softkey $30b_{10}$. In the example illustrated in FIG. 2, elements of "menu e1-(3)", "menu e1-(2)", and "address e1-(1)" are allocated to the softkeys $30b_7$ to $30b_9$, as a first round of the allocation element. In the example illustrated in FIG. 2, there is allocation with respect to a plurality of softkeys configuring the second softkey group G2 after a second round, as the allocation element. That is, as illustrated in FIG. 2, elements of "text e2-(8)", "menu e2-(7)", "menu e2-(6)", "link e2-(5)", "link e2-(4)", "link e2-(3)", "link e2-(2)", and "link e2-(1)" are allocated to the softkeys $30b_2$ to $30b_9$, as a second round of the allocation element. As illustrated in FIG. 2, elements of "menu e2-(12)", "text e2-(11)", "menu e2-(10)", and "text e2-(9)" are allocated to the softkeys $30b_6$ to $30b_9$, as a third round of the allocation element. As illustrated in FIG. 2, elements of "menu e3-(2)" and "menu e3-(1)" are allocated to the softkeys $30b_8$ and $30b_9$, as a fourth round of the allocation element. The data of the allocation partition and the allocation element illustrated in FIG. 2 is recorded in the key data 9C, according to processing which is realized by the controller 10 by executing the control program 9A. The data of the allocation partition and the allocation element recorded in the key data 9C may be updated whenever the allocation with respect to the softkey is modified. A timing at which the allocation of the softkey is modified includes a timing when the screen displayed on the touch screen display 2 is modified.

The element classification rule 9D is appropriate to a rule for classifying the elements included in the contents. FIG. 3 is a diagram illustrating an example of an element classification rule according to some embodiments. As illustrated in FIG. 3, in the element classification rule 9D, a web screen which can be browsed by a predetermined browser such as a web page, a table calculation screen which is displayed according to the execution of a table calculation application, a document editing screen which is displayed according to execution of a document editing application, and the like, are set to a target screen. The element classification rule 9D includes an address bar, a menu part, a link part, an in-page text, an in-page image, and the like, as a classification element from the web screen. The address bar, for example, corresponds to a widget to be used in a web browser on which a uniform resource locater (URL), a home page address, or the like is described. The menu part, for example, corresponds to various navigation menus arranged on the web screen. The link part, for example, corresponds to a hyperlink or the like described on the web screen. The in-page text, for example, corresponds to text data described on web screen. The in-page image, for example, corresponds to image data attached onto the web screen. Similarly, the element classification rule 9D includes a menu part, a worksheet, a graphic chart, an in-worksheet (cell) text, and the like, as a classification element from the table calculation screen. Similarly, the element classification rule 9D includes a menu part, a document input area, a graphic chart, an in-document input area text, and the like, as a classification element from the document editing screen.

As illustrated in FIG. 3, the element classification rule 9D includes information of a partition which is set for enabling the user selection to be collectively performed with respect to each of the elements classified from the contents. For example, the element classification rule 9D includes information of "address" which is set as a partition corresponding to the address bar, "menu" which is set as a partition corresponding to the menu part, "link" which is set as a partition corresponding to the link part, "text" which is set as a partition corresponding to the in-page text, and "image" which is set as a partition corresponding to the in-page image, with respect to the web screen. Similarly, the element classification rule 9D also includes information of a partition which is set for enabling the user selection to be collectively performed with respect to each of the elements, with respect to the table calculation screen and the document editing screen.

As illustrated in FIG. 3, the element classification rule 9D includes information of a priority at the time of allocating the element of the contents to the softkey. The information of the priority included in the element classification rule 9D is information which has been set in advance according to the target screen (the type of contents). For example, the element classification rule 9D includes information of a priority of "1" with respect to "in-page text", a priority of "2" with respect to "link part", a priority of "3" with respect to "address bar", a priority of "4" with respect to "menu part", and a priority of "5" with respect to "in-page image", with respect to the web screen. Similarly, the element classification rule 9D also includes the information of a priority at the time of allocating the element of the contents to the softkey, with respect to the table calculation screen and the document editing screen. The information of the priority included in the element classification rule 9D may include a case where there is no relative merit with respect to the classification element (for example, "no priority"). The priority is merely reference data in allocation processing of the softkey based on the user attribute-corresponding priority table 9E described below. In a case where the information of the priority included in the element classification rule 9D is set to "no priority" in which there is no relative merit with respect to the classification element, the information of the priority corresponding to the user attribute is not used for the allocation of the element included in the contents with respect to the softkey, and thus, the user attribute-corresponding priority table 9E described below (refer to FIG. 4), and the user attribute data described below (refer to FIG. 5) may not be stored in the storage 9.

The user attribute-corresponding priority table 9E is referred to when the processing of allowing the electronic device 1 to allocate the element included in the contents (for example, the element on the web screen) to the softkey is executed by the function provided by the control program 9A. FIG. 4 is a diagram illustrating an example of a user attribute-corresponding priority table according to some embodiments. As illustrated in FIG. 4, the user attribute-corresponding priority table 9E stores information indicating the range of the priority of the element to be subjected to the allocation with respect to the softkey, for each of the user attributes of the electronic device 1. Here, the user attribute is information which can be arbitrarily set in order to determine whether or not the element included in the contents is a useful element to the user of the electronic device 1, and for example, information of a visual acuity of the user, and the like can be adopted as the user attribute. In a case where the user is appropriate to "attribute 1" (in a case where the attribute 1 is set as the user attribute), the controller 10 allocates the elements of all priorities included in the contents, to the softkey, with reference to the user attribute-corresponding priority table 9E. In a case where the user attribute is appropriate to the "attribute 2" (in a case where the attribute 2 is set as the user attribute), the controller 10 allocates the elements of the priorities 1 to 3 in the elements included in the contents, to the softkey, with reference to the user attribute-corresponding priority table 9E. In a case where the user attribute is appropriate to "attribute 3" (in a case where the attribute 3 is set as the user attribute), the controller 10 allocates only the element of the priority 1 in the elements included in the contents, to the softkey, with reference to the user attribute-corresponding priority table 9E. In a case where a user whose visual acuity is greater than or equal to 0.7 in both eyes is partitioned to "attribute 1", a user whose visual acuity is greater than or equal to 0.02 and less than to 0.7 in both eyes is partitioned to "attribute 2", and a user whose visual acuity is completely blind to less than 0.02 is partitioned to "attribute 3", in the example illustrated in FIG. 4, more visual information (information which is considered that the degree of being visually perceived is large) is excluded from an allocation target of the softkey, as the visual acuity of the user becomes weaker. Thus, the electronic device 1 modifies the allocation of the elements classified from the contents, with respect to the softkey, according to the user attribute, and thus, an operation environment according to the user can be provided, and as a result thereof, it is possible to improve operability of the contents.

The user attribute-corresponding priority table 9E described above is in a state where the range of the priority corresponding to the user attribute is set in advance, and for example, the electronic device may include a table which can be arbitrarily set such that an element which is considered to be unnecessary by the user of the electronic device 1 is not allocated to the softkey.

The setting data 9Z is data which is referred to when the electronic device 1 executes various processings by the function provided by the control program 9A. FIG. 5 is a diagram illustrating an example of user attribute data according to some embodiments. As illustrated in FIG. 5, the setting data 9Z is capable of storing data arbitrarily set as the user attribute (for example, "attribute 1").

The controller 10 includes an arithmetic processing device. Examples of the arithmetic processing device include, but are not limited to a central processing unit (CPU), a system-on-a-chip (SoC), a micro control unit (MCU), a field-programmable gate array (FPGA), and a coprocessor. The controller 10 realizes various functions by integrally controlling the operation of the electronic device 1.

Specifically, the controller 10 executes a command which is included in the program stored in the storage 9, with reference to the data stored in the storage 9 as necessary. Then, the controller 10 controls a functional unit according to the data and the command, and thus, realizes various functions. Examples of the functional unit include, but are not limited to, the display 2A, the communication unit 6, the microphone 8, and the speaker 11. The controller 10 modifies the control according to a detection result of a detection unit. Examples of the detection unit include, but are not limited to the touch screen 2B, the button 3, the illuminance sensor 4, the proximity sensor 5, the microphone 8, the camera 12, the camera 13, and the motion sensor 15.

The controller 10 executes the control program 9A, and thus, is capable of realizing the processing relevant to various operations of the electronic device 1. The controller 10 executes the control program 9A, and thus, is capable of realizing the processing relevant to the operation of the contents, and the like, to be displayed on the touch screen display 2. For example, the controller 10 is capable of realizing processing of classifying the elements included in the contents to be displayed on the touch screen display 2, on the basis of the element classification rule 9D, to allocate the classified element to one or a plurality of softkeys. For example, the controller 10 is capable of realizing processing of setting the contents to be displayed on the touch screen display 2 to be in a predetermined area on the touch screen display 2, to allocate the area where the contents are set, to any softkey of the first softkey group. For example, in a case where the operation of the softkey of the first softkey group is detected, the controller 10 is capable of realizing processing of classifying the element of the contents included in the area corresponding to the softkey of which the operation is detected, on the basis of the element classification rule 9D. For example, the controller 10 is capable of realizing processing of sorting an element appropriate to the priority corresponding to the user attribute data, from the classified element. For example, the controller 10 is capable of realizing processing of allocating the element sorted on the basis of the user attribute to any softkey of the second softkey group. For example, the controller 10 is capable of realizing processing of setting a partition for enabling the user selection to be collectively performed with respect to each of the elements sorted on the basis of the user attribute, to allocate the set partition to the softkey of the first softkey group. For example, the controller 10 is capable of realizing processing of outputting a sound corresponding to the element allocated to the softkey of which the operation is detected or the partition of the element.

The speaker 11 outputs a sound signal transmitted from the controller 10, as a sound. The speaker 11, for example, is used for outputting an incoming sound and music. One of the receiver 7 and the speaker 11 may have a function of the other one.

The camera 12 and the camera 13 convert a captured image into an electric signal. The camera 12 is an in-camera capturing an object facing the display 2A. The camera 13 is an out-camera capturing an object facing the opposite side of the display 2A. The camera 12 and the camera 13 may be mounted on the electronic device 1 in a state of being functionally and physically combined, as a camera unit in which the in-camera and the out-camera can be used by being switched.

The connector 14 is a terminal to which the other device is connected. The connector 14 may be a general-purpose terminal such as a universal serial bus (USB), a high-definition multimedia interface (HDMI (registered trademark)), a light peak (Thunder bolt (registered trademark)), and an earphone-microphone connector. The connector 14 may be a dedicated terminal such as a Dock connector. Examples of the device to be connected to the connector 14 include, but are not limited to an external storage, a speaker, and a communication device.

The motion sensor 15 is capable of detecting various information items for determining the operation of the user who carries the electronic device 1. The motion sensor 15 may be configured as a sensor unit provided with an acceleration sensor, a direction sensor, a gyroscope, a magnetic sensor, a pneumatic sensor, and the like.

The electronic device 1 may include a GPS receiver and a vibrator, in addition to each of the functional units described above. The GPS receiver receives an electrical wave signal of a predetermined frequency band from a GPS satellite. The GPS receiver performs demodulation processing with respect to the received electrical wave signal, and transmits the processed signal to the controller 10. The GPS receiver supports arithmetic processing with respect to the current position of the electronic device 1. The electronic device 1 may include a receiver which is capable of receiving a signal of an artificial satellite for positioning, in addition to the GPS satellite, and may execute the arithmetic processing with respect to the current position. The vibrator vibrates a part of the electronic device 1 or the entire electronic device 1. In order to generate vibration, the vibrator, for example, includes a piezoelectric element, an eccentric motor, or the like. The electronic device 1 is provided with a functional unit which is obviously used for maintaining the function of the electronic device 1, such as a battery, and a controller which is obviously used for realizing the control of the electronic device 1.

The electronic device 1 may access a storage server on a cloud through the communication unit 6, and may acquire various programs and data items.

An example of an allocation method of the softkey corresponding to the web screen according to some embodiments will be described with reference to FIGS. 6 to 12. FIGS. 6 to 12 are diagrams illustrating the outline of the allocation of the element included in the web screen according to some embodiments with respect to the softkey. In the following description, the user attribute of the user of the electronic device 1 (for example, the attribute 1) is set in advance.

Figure 6:
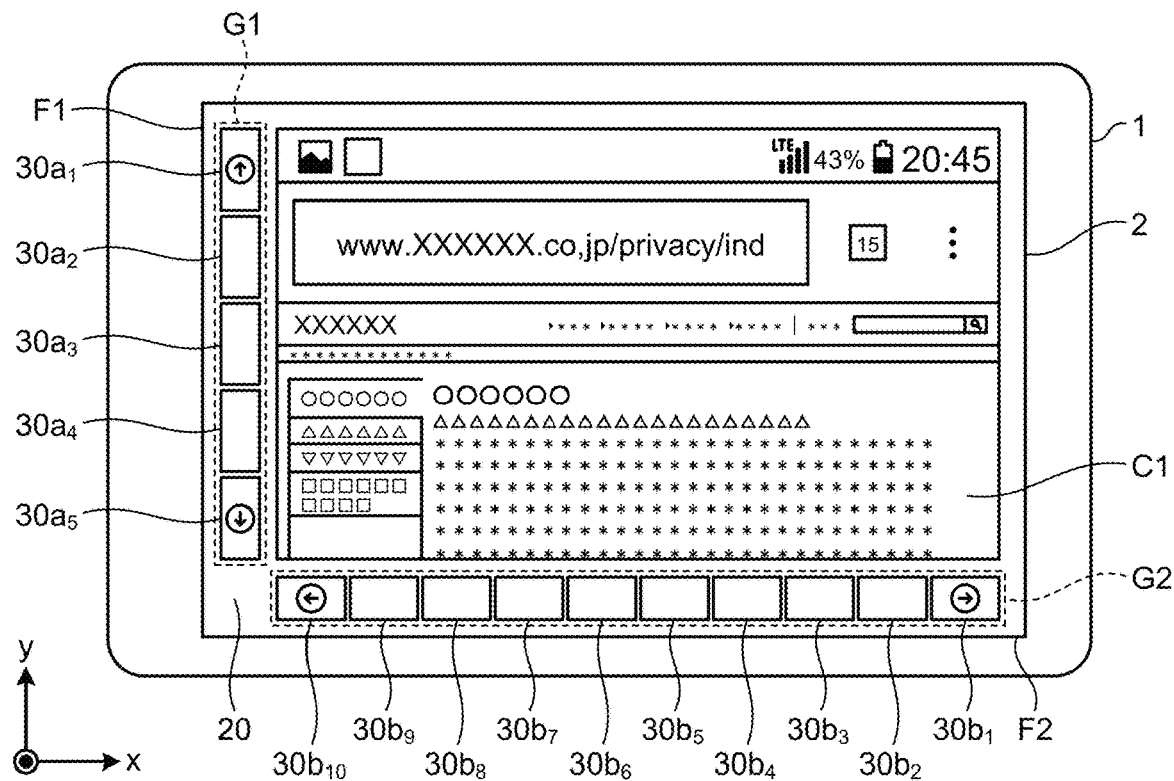
FIG. 6 is a diagram illustrating an outline of allocation of elements included in a web screen with respect to a softkey, according to some embodiments.

The electronic device 1 illustrated in FIG. 6 displays the first softkey group G1 including a plurality of softkeys arranged in one column in a direction parallel to a y axis along an edge F1 of the touch screen display 2, and the second softkey group G2 including a plurality of softkeys arranged in one column in a direction parallel to an x axis along an edge F2 of the touch screen display 2, on the touch screen display 2. The first softkey group G1 is configured of five softkeys of a softkey $30a_1$, . . . , and a softkey $30a_5$, illustrated in FIG. 6, in total. The second softkey group G2 is configured of ten softkeys of a softkey $30b_1$, . . . , and a softkey $30b_{10}$, illustrated in FIG. 6, in total. The number of softkeys configuring each of the first softkey group G1 and the second softkey group G2, illustrated in FIG. 6 is an example, and may not be necessarily configured of softkeys of the same number as that in the example illustrated in FIG. 6. An arrangement position of the first softkey group G1 illustrated in FIG. 6 is an example, and the first softkey group G1 may be arranged along an edge different from the edge F1 of the touch screen display 2 illustrated in FIG. 6. Similarly, the second softkey group G2 illustrated in FIG. 6 may be arranged along an edge different from the edge F2 of the touch screen display 2 illustrated in FIG. 6. In the example illustrated in FIG. 6, although the softkey $30a_1$, . . . , and the softkey $30a_5$ are arranged along the edge F1 of the housing of the electronic device 1, they may be arranged along one side configuring the outline of the housing of the electronic device 1. Similarly, the softkey $30b_1$, . . . , and the softkey $30b_{10}$ may be arranged along one side configuring the outline of the housing of the electronic device 1. In the example illustrated in FIG. 6, the electronic device 1 displays a web screen C1 on the touch screen display 2.

Figure 7:
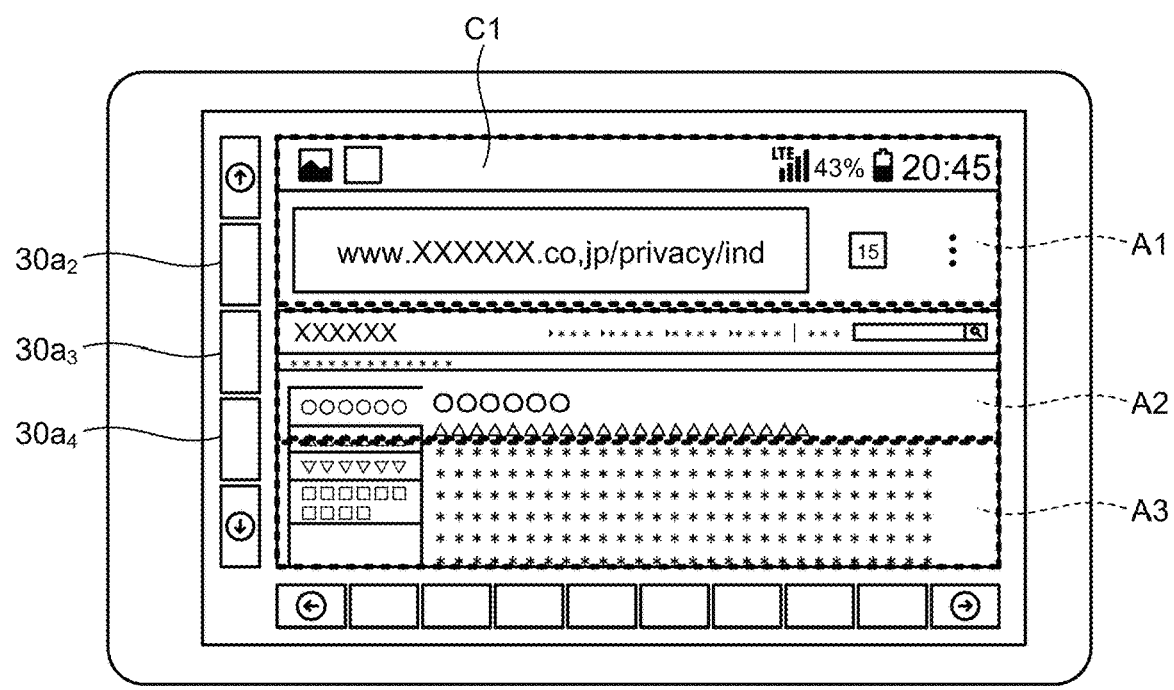
FIG. 7 is a diagram illustrating the outline of the allocation of the elements included in the web screen with respect to the softkey, according to some embodiments.

The electronic device 1, for example, sets the web screen C1 to be displayed on the touch screen display 2 to be in three areas of areas A1, A2, and A3 as illustrated in FIG. 7, at a timing when the web screen C1 is subjected to reduced display, and thus, the softkey interface is displayed on the blank area 20 formed on the touch screen display 2. Subsequently, the electronic device 1 allocates the area A1 to the softkey $30a_2$ of the first softkey group G1, allocates the area A2 to the softkey $30a_3$ of the first softkey group G1, and allocates the area A3 to the softkey $30a_4$ of the first softkey group G1.

Figure 8:
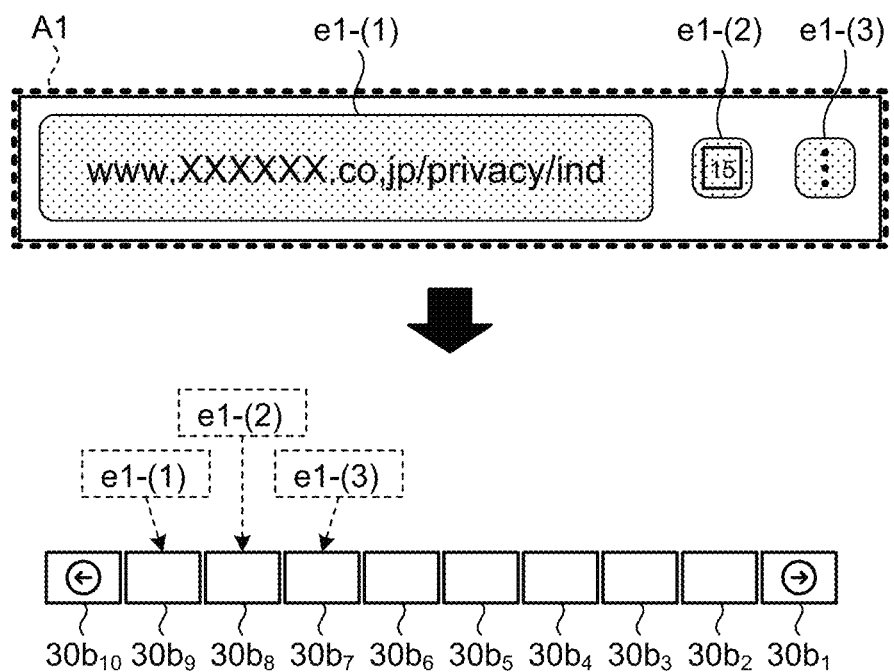
FIG. 8 is a diagram illustrating the outline of the allocation of the elements included in the web screen with respect to the softkey, according to some embodiments.

For example, in a case where an operation of the softkey $30a_2$ is detected, as illustrated in FIG. 8, the electronic device 1 classifies an element of the web screen C1 included in the area A1 corresponding to the softkey $30a_2$, on the basis of the element classification rule 9D. That is, the electronic device 1 extracts each element such as an address bar, a menu part, a link part, an in-page text, and an in-page image, included in the web screen C1, as an allocation target of the softkey. In the example illustrated in FIG. 8, an element e1-(1), an element e1-(2), and an element e1-(3) are classified as the element of the web screen C1 included in the area A1. Subsequently, the electronic device 1 sorts an element appropriate to the priority corresponding to the user attribute data, in the element e1-(1), the element e1-(2), and the element e1-(3), with reference to the user attribute data and the user attribute-corresponding priority table 9E. For example, in a case where the element e1-(1), the element e1-(2), and the element e1-(3) are sorted, the electronic device 1 allocates the element e1-(1) to the softkey $30b_9$ included in the second softkey group G2, allocates the element e1-(2) to the softkey $30b_8$ included in the second softkey group G2, and allocates the element e1-(3) to the softkey $30b_7$ included in the second softkey group G2.

Figure 9:
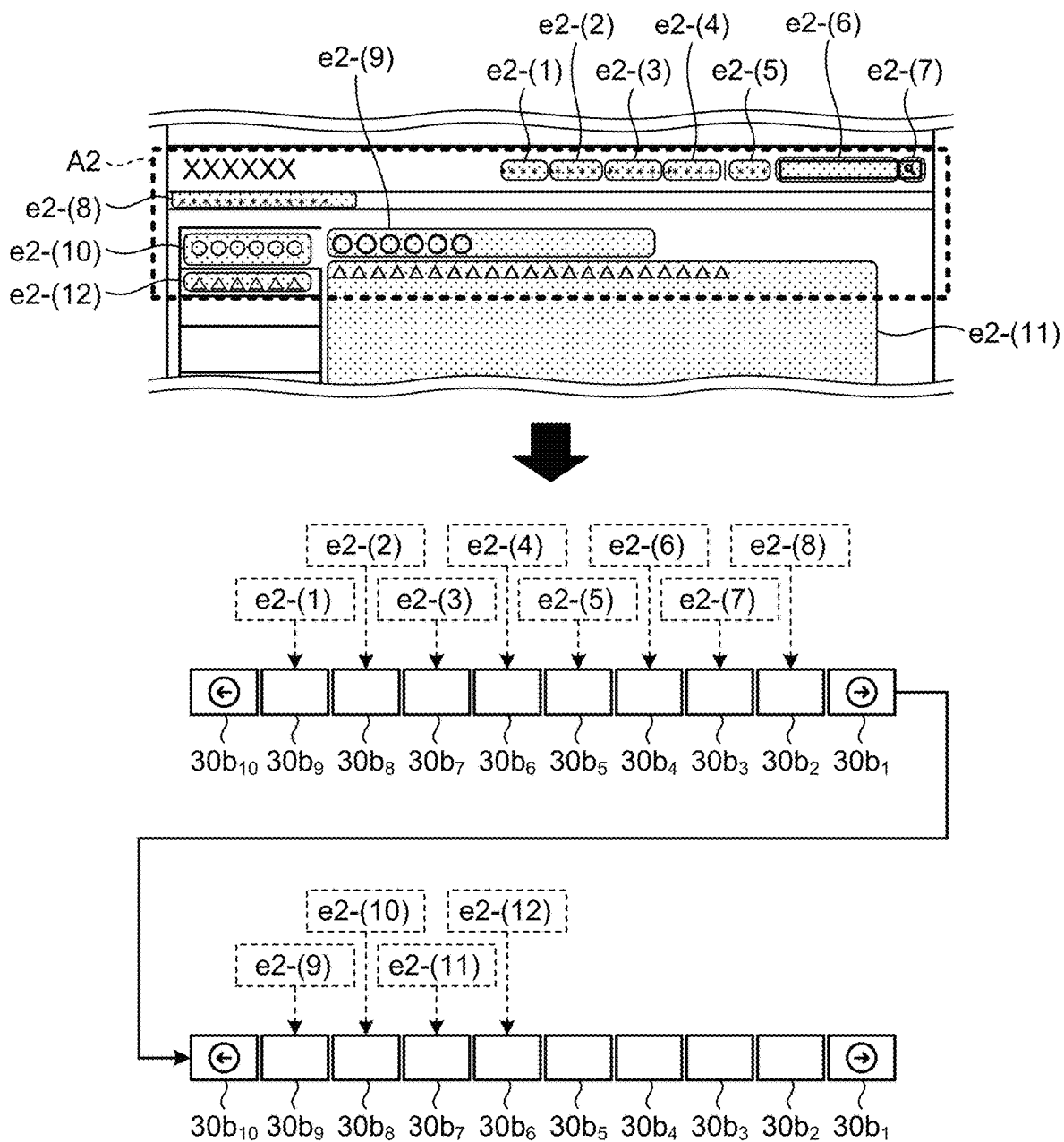
FIG. 9 is a diagram illustrating the outline of the allocation of the elements included in the web screen with respect to the softkey, according to some embodiments.

For example, in a case where an operation of the softkey $30a_3$ is detected, as illustrated in FIG. 9, the electronic device 1 classifies an element of the web screen C1 included in the area A2 corresponding to the softkey $30a_3$, on the basis of the element classification rule 9D. In the example illustrated in FIG. 9, twelve elements of an element e2-(1) to an element e2-(12) are classified as the element of the web screen C1 included in the area A2. Subsequently, the electronic device 1 sorts an element appropriate to the priority corresponding to the user attribute data, in twelve elements of the element e2-(1) to the element e2-(12), with reference to the user attribute data and the user attribute-corresponding priority table 9E. For example, in a case where all of the elements of the element e2-(1) to the element e2-(12) are sorted, the electronic device 1, first of all, allocates eight elements of the element e2-(1) to the element e2-(8) to the softkey $30b_9$ to the softkey $30b_2$ included in the second softkey group G2, respectively. Subsequently, returning to the softkey $30b_9$, the electronic device 1 allocates four elements of the element e2-(9) to the element e2-(12) to each of the softkey $30b_9$ to the softkey $30b_6$, in sequence. Thus, in a case where the number of elements to be allocated to the softkey is greater than the number of softkeys included in the second softkey group G2, the electronic device 1 is capable of redundantly allocating different elements to the same softkey by using the softkey included in the second softkey group G2 in circulation.

Figure 10:
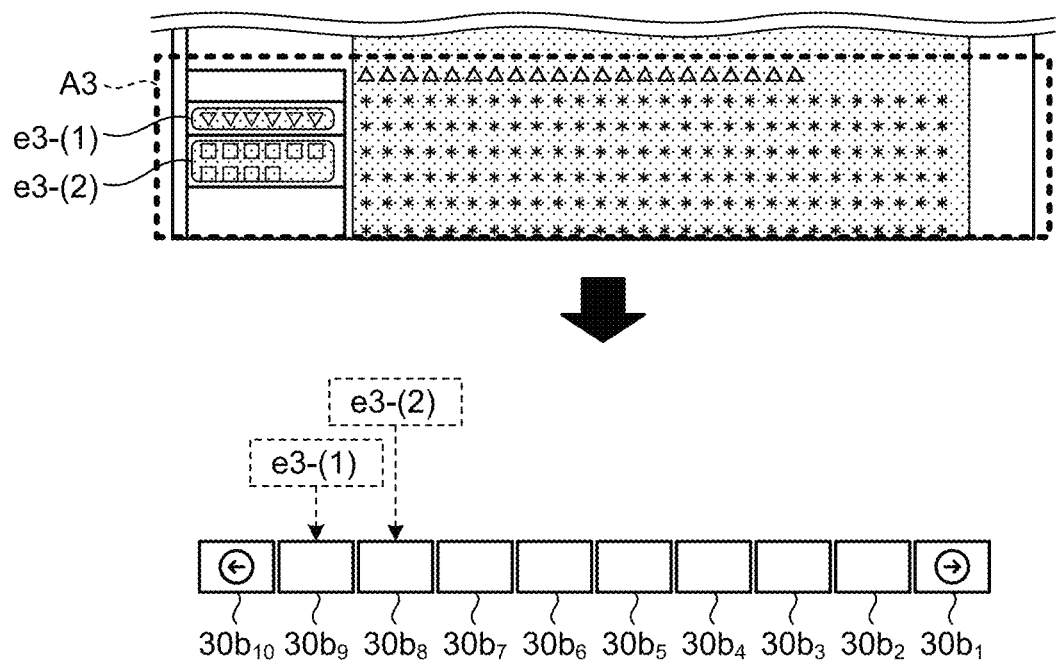
FIG. 10 is a diagram illustrating the outline of the allocation of the elements included in the web screen with respect to the softkey, according to some embodiments.

For example, in a case where an operation of the softkey $30a_4$ is detected, as illustrated in FIG. 10, the electronic device 1 classifies an element of the web screen C1 included in the area A3 corresponding to the softkey $30a_4$, on the basis of the element classification rule 9D. In the example illustrated in FIG. 10, an element e3-(1) and an element e3-(2) are classified as the element of the web screen C1 included in the area A3. Subsequently, the electronic device 1 sorts an element appropriate to the priority corresponding to the user attribute data, in the element e3-(1) and the element e3-(2), with reference to the user attribute data and the user attribute-corresponding priority table 9E. For example, in a case where the element e3-(1) and the element e3-(2) are sorted, the electronic device 1 allocates the element e3-(1) to the softkey $30b_9$ included in the second softkey group G2, and allocates the element e3-(2) to the softkey $30b_8$ included in the second softkey group G2.

Figure 11:
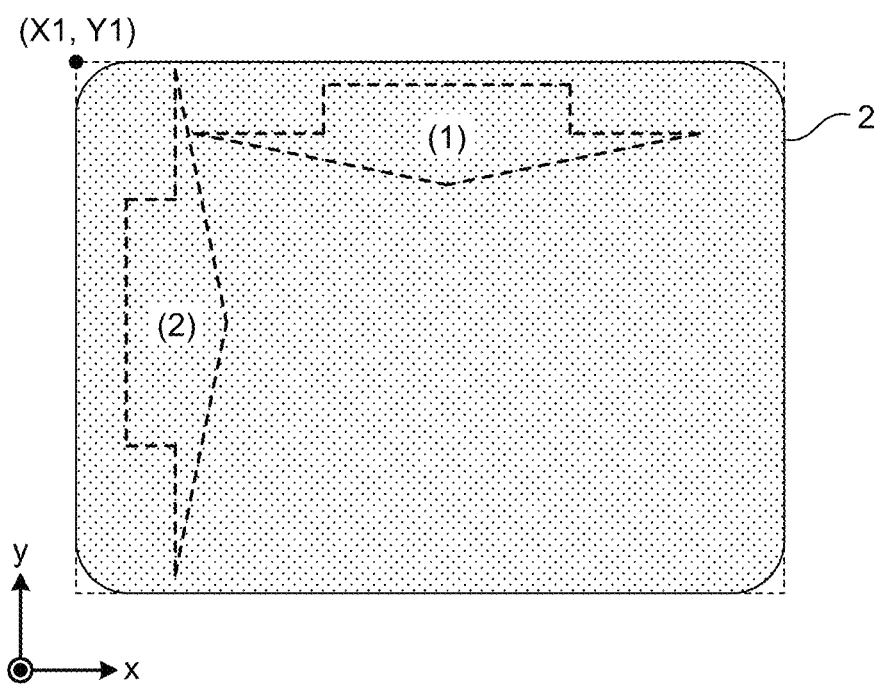
FIG. 11 is a diagram illustrating the outline of the allocation of the elements included in the web screen with respect to the softkey, according to some embodiments.
Figure 12:
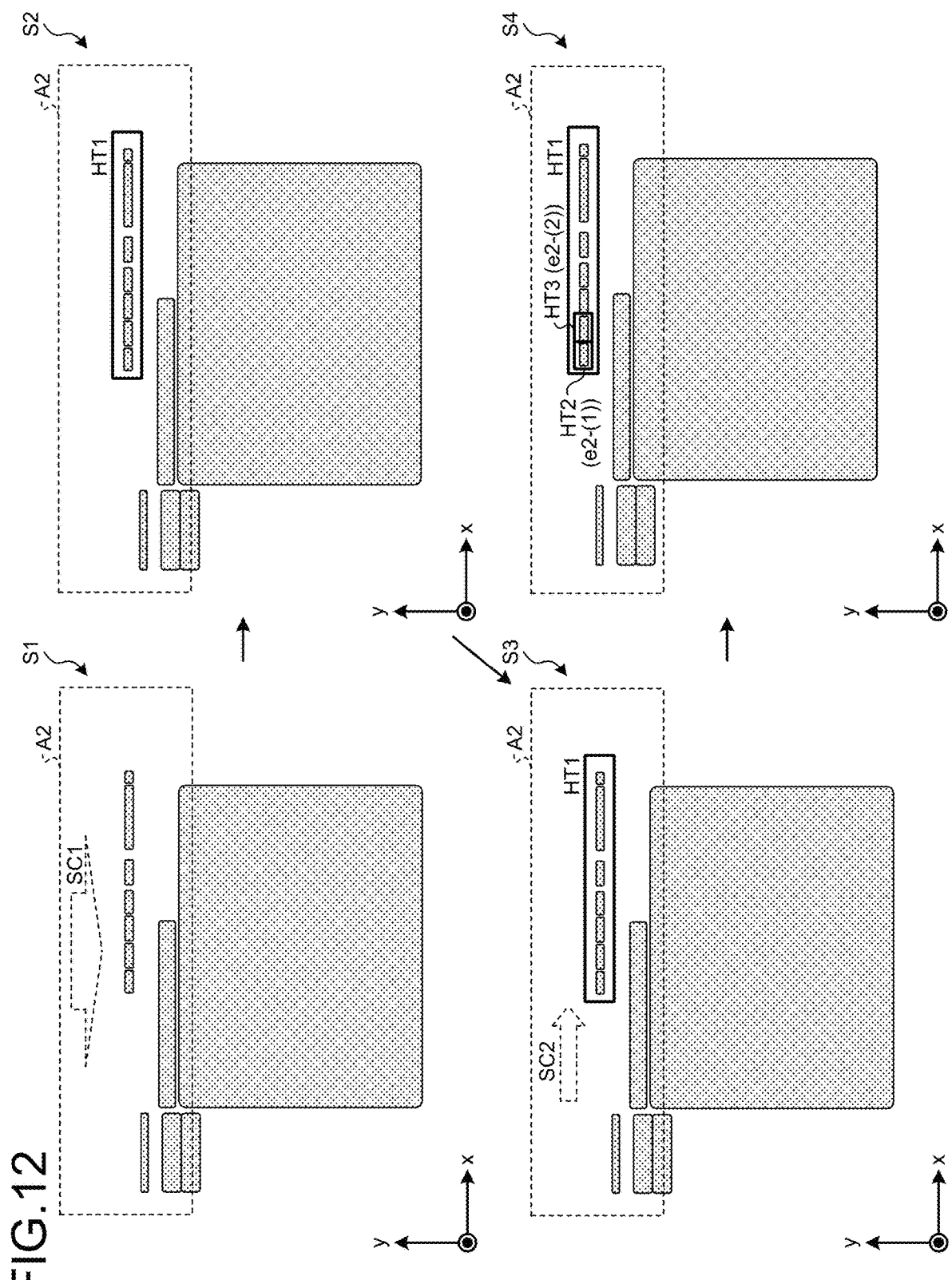
FIG. 12 is a diagram illustrating the outline of the allocation of the elements included in the web screen with respect to the softkey, according to some embodiments.

As illustrated in FIG. 11, the electronic device 1, for example, classifies the element on the web screen C1 by scanning the touch screen display 2 in a direction (1) parallel to a y axis direction and a direction (2) parallel to an x axis direction, on the basis of coordinates (X1, Y1) of the touch screen display 2, and thus, is capable of performing numbering in the classified order. FIG. 12, for example, illustrates scan transition with respect to the area A2 on the touch screen display 2 where the web screen C1 is set. The electronic device 1 starts a scan SC1 towards the direction (1) parallel to the y axis direction (Step S1). The electronic device 1 detects an area HT1 on the web screen C1 by the scan SC1 (Step S2). The electronic device 1 starts a scan SC2 with respect to the area HT1 towards the direction (2) parallel to the x axis direction (Step S3). The electronic device 1 applies an identification number e2-(1) to an element included in an area HT2 detected by the scan SC2, and applies an identification number e2-(2) to an element included in an area HT3 detected following the area HT2 (Step S4). Thus, the entire area of the area A2 is scanned, and then, the other area on the touch screen display 2 where the web screen C1 is set is also scanned by the same method as that of the area A2, and thus, classification and numbering of the element included in the web screen C1 are executed. The electronic device 1 allocates the element on the web screen C1 to the softkey, in the numbering order.

The electronic device 1 allocates the elements classified from the web screen C1 to the softkeys included in the second softkey group G2, respectively, and then, cancels the allocation of the area A1 with respect to the softkey $30a_2$, the allocation of the area A2 with respect to the softkey $30a_3$, and the allocation of the area A3 with respect to the softkey $30a_4$, and newly allocates partitions of the elements sorted from the elements included in the web screen C1 to the softkeys of the first softkey group G1, respectively. The electronic device 1, for example, allocates "image", which is a partition corresponding to the in-page image, to the softkey $30a_2$, allocates "text", which is a partition corresponding to the in-page text, to the softkey $30a_3$, and allocates "link", which is a partition corresponding to the link part, to the softkey $30a_4$, in the elements sorted from the web screen C1.

When the allocation illustrated in FIGS. 6 to 12 described above is executed, the electronic device 1 records data relevant to the allocation in the key data 9C as manage information such that a correspondence relationship between the softkey and the element allocated to the softkey is understood (refer to FIG. 2).

In the examples illustrated in FIGS. 6 to 12 described above, the electronic device 1 executes the scan of the web screen C1 by taking the operation detection of the softkey of the first softkey group G1 as a trigger, and thus, the classification and the sorting of the elements included in the web screen C1, and the allocation of the sorted element with respect to the softkey are executed, but embodiments are not limited thereto. For example, the electronic device 1 may automatically execute the classification of the elements included in the web screen C1, and the allocation of the classified element with respect to the softkey, for each of the areas A1, A2, and A3, at a timing when the web screen C1 is set to be in three areas of the areas A1, A2, and A3 on the touch screen display 2.

Subsequently, an example of the operation of the electronic device according to some embodiments will be described with reference to FIGS. 13 to 16. FIGS. 13 to 16 are diagrams illustrating an example of the operation of the electronic device according to some embodiments. FIGS. 13 to 16 described below illustrate an operation executed by the electronic device 1 according to an operation with respect to the softkey when the allocation of the elements included in the contents with respect to the softkey is ended, and then, the softkey is operated by the user. That is, the electronic device 1 executes processing of outputting information relevant to the element allocated to the softkey, or the like, as a sound, or the like according to the operation with respect to the softkey by the user.

Figure 13:
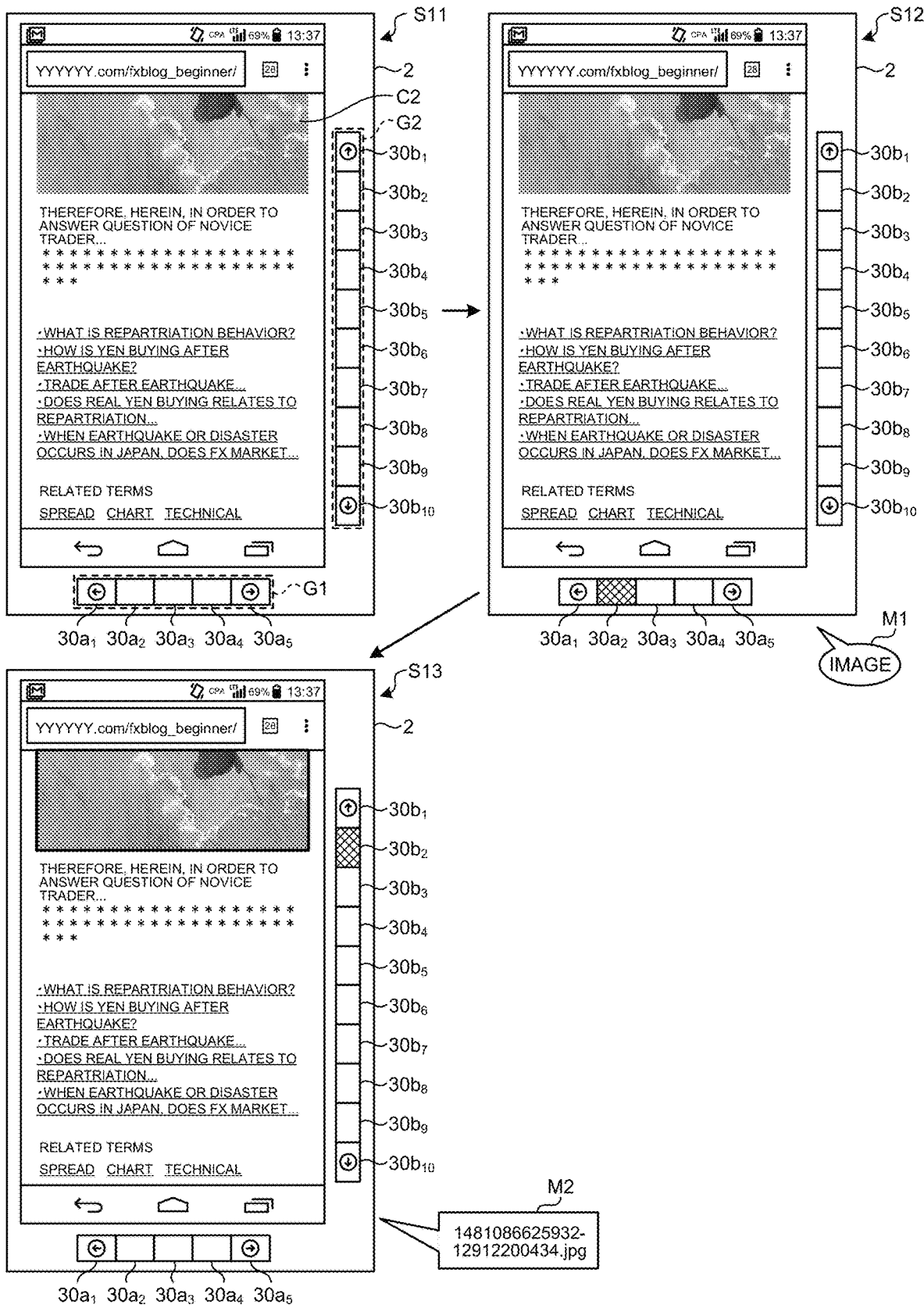
FIG. 13 is a diagram illustrating an example of an operation of the electronic device according to some embodiments.

In the example illustrated in FIG. 13, the electronic device 1 displays a web screen C2 on the touch screen display 2 (Step S11).

In a case where an operation with respect to the softkey $30a_2$ of the first softkey group G1 is detected, the electronic device 1 outputs a sound M1 reading out a partition ("image") of an element which is allocated to the softkey $30a_2$ (Step S12).

In a case where an operation with respect to the softkey $30b_2$ of the second softkey group G2 is detected after the operation with respect to the softkey $30a_2$ is received, the electronic device 1 outputs a sound M2 reading out an ID of an image which is allocated to the softkey $30b_2$ (Step S13).

Figure 14:
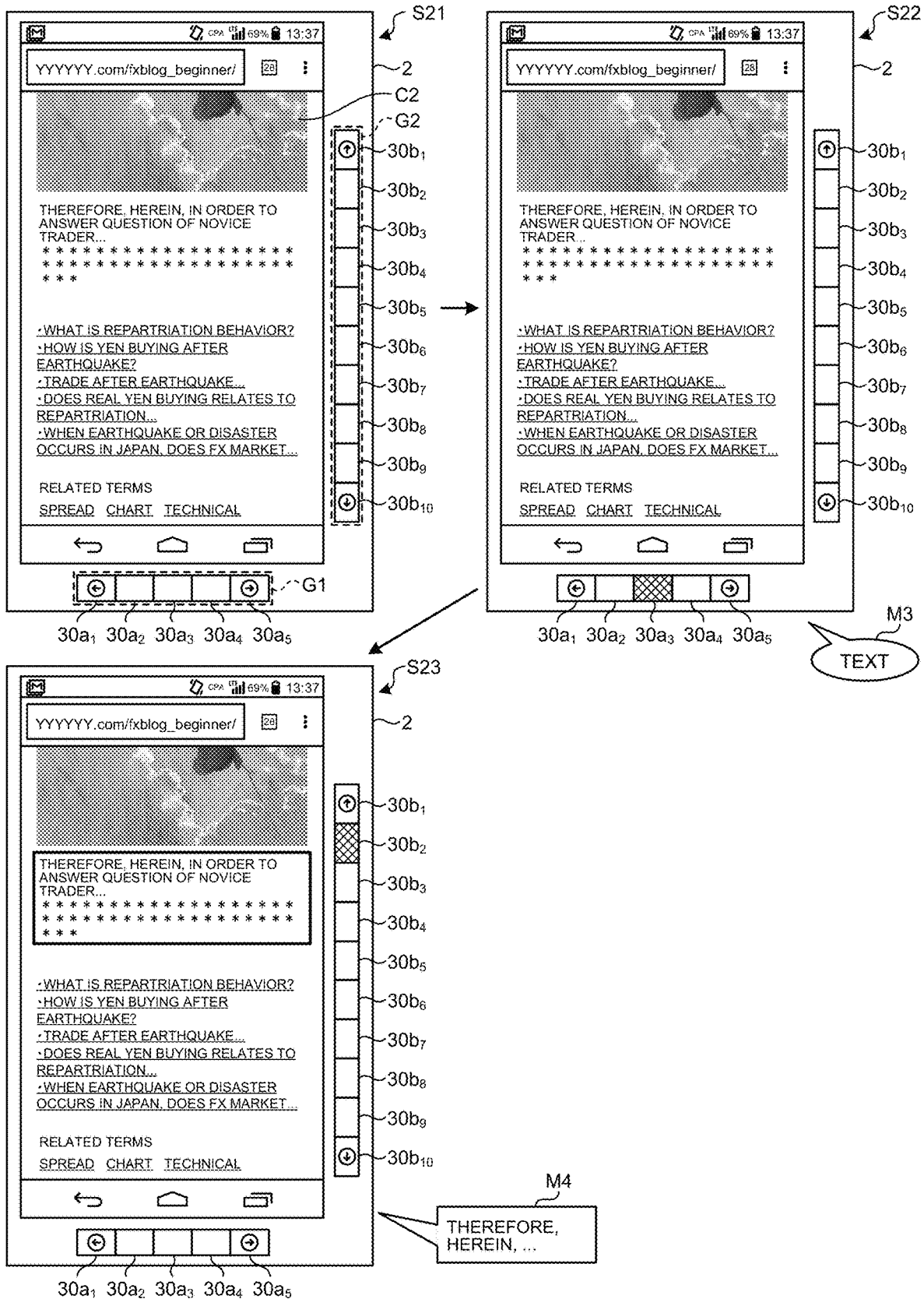
FIG. 14 is a diagram illustrating an example of the operation of the electronic device according to some embodiments.

In the example illustrated in FIG. 14, as with the example illustrated in FIG. 13, the electronic device 1 displays the web screen C2 on the touch screen display 2 (Step S21).

In a case where an operation with respect to the softkey $30a_3$ of the first softkey group G1 is detected, the electronic device 1 outputs sound M3 reading out a partition ("text") of an element which is allocated to the softkey $30a_3$ (Step S22).

In a case where an operation with respect to the softkey $30b_2$ of the second softkey group G2 is detected after the operation with respect to the softkey $30a_3$ is received, the electronic device 1 outputs a sound M4 reading out the contents described on a text which is allocated to the softkey $30b_2$ (Step S23).

Figure 15:
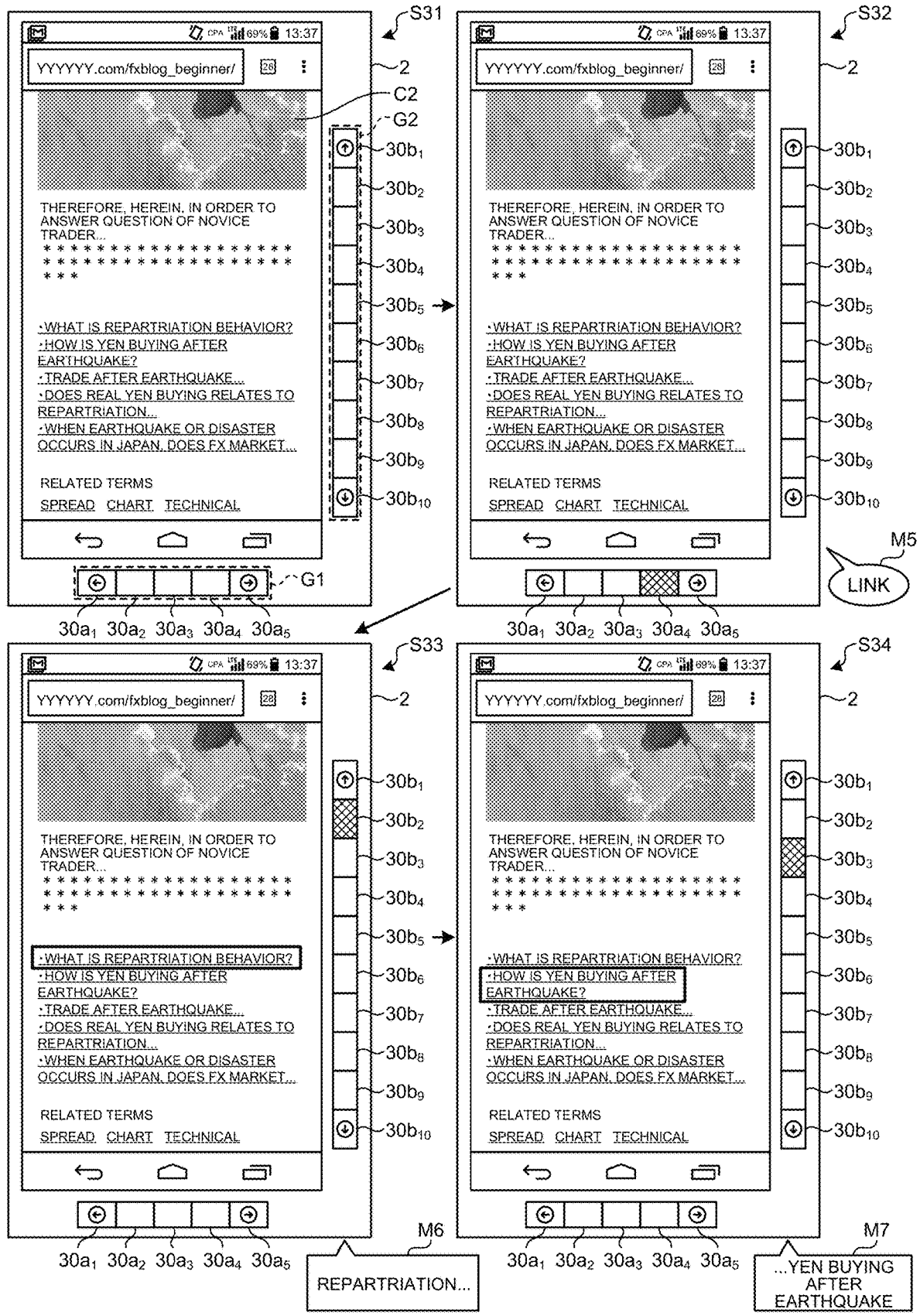
FIG. 15 is a diagram illustrating an example of the operation of the electronic device according to some embodiments.

In the example illustrated in FIG. 15, as with the example illustrated in FIG. 13, electronic device 1 displays the web screen C2 on the touch screen display 2 (Step S31).

In a case where an operation with respect to the softkey $30a_4$ of the first softkey group G1 is detected, the electronic device 1 outputs a sound M5 reading out a partition ("link") of an element which is allocated to the softkey $30a_4$ (Step S32).

In a case where an operation with respect to the softkey $30b_2$ of the second softkey group G2 is detected after the operation with respect to the softkey $30a_4$ is received, the electronic device 1 outputs a sound M6 reading out the contents described on a link which is allocated to the softkey $30b_2$ (Step S33). In a case where an operation with respect to the softkey $30b_3$ is detected subsequent to the operation with respect to the softkey $30b_2$, the electronic device 1 outputs a sound M7 reading out the contents described on a link which is allocated to the softkey $30b_3$ (Step S34).

Figure 16:
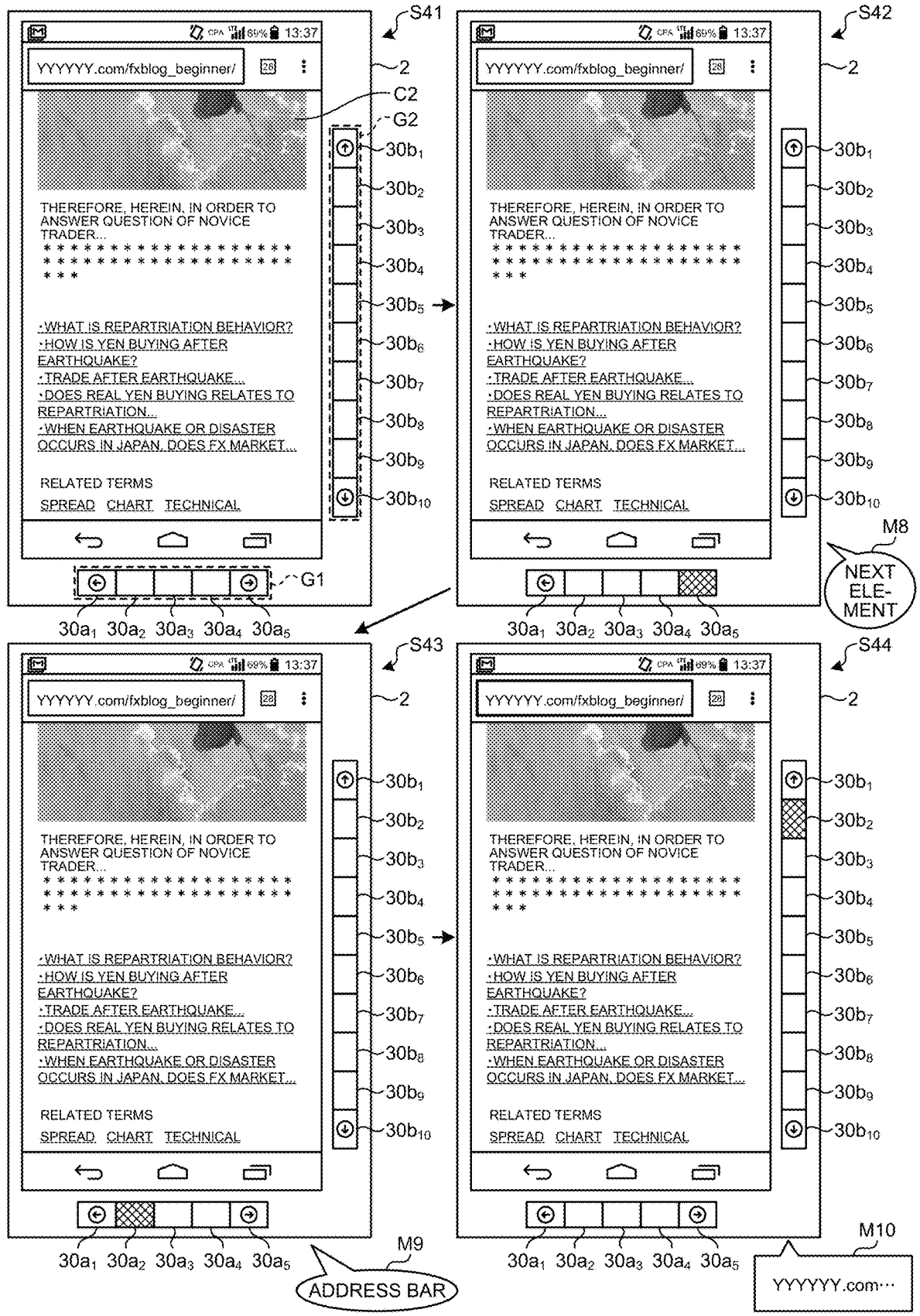
FIG. 16 is a diagram illustrating an example of the operation of the electronic device according to some embodiments.

In the example illustrated in FIG. 16, as with the example illustrated in FIG. 13, the electronic device 1 displays the web screen C2 on the touch screen display 2 (Step S41).

In a case where an operation with respect to the softkey $30a_5$ of the first softkey group G1 is detected, the electronic device 1 outputs a sound M8 reading out the effect of moving to selection of a partition of another element which is allocated after a second round from the softkey $30a_2$ to the softkey $30a_4$ (Step S42).

In a case where an operation of the softkey $30a_2$ of the second round is received subsequent to the operation with respect to the softkey $30a_5$, the electronic device 1 outputs a sound M9 reading out a partition ("address") of an element which is allocated to the softkey $30a_2$ of the second round (Step S43).

In a case where an operation with respect to the softkey $30b_2$ of the second softkey group G2 is detected after the operation with respect to the softkey $30a_2$ of the second round is received, the electronic device 1 outputs a sound M10 reading out the contents described on an address bar which is allocated to the softkey $30b_2$ (Step S44).

Figure 17:
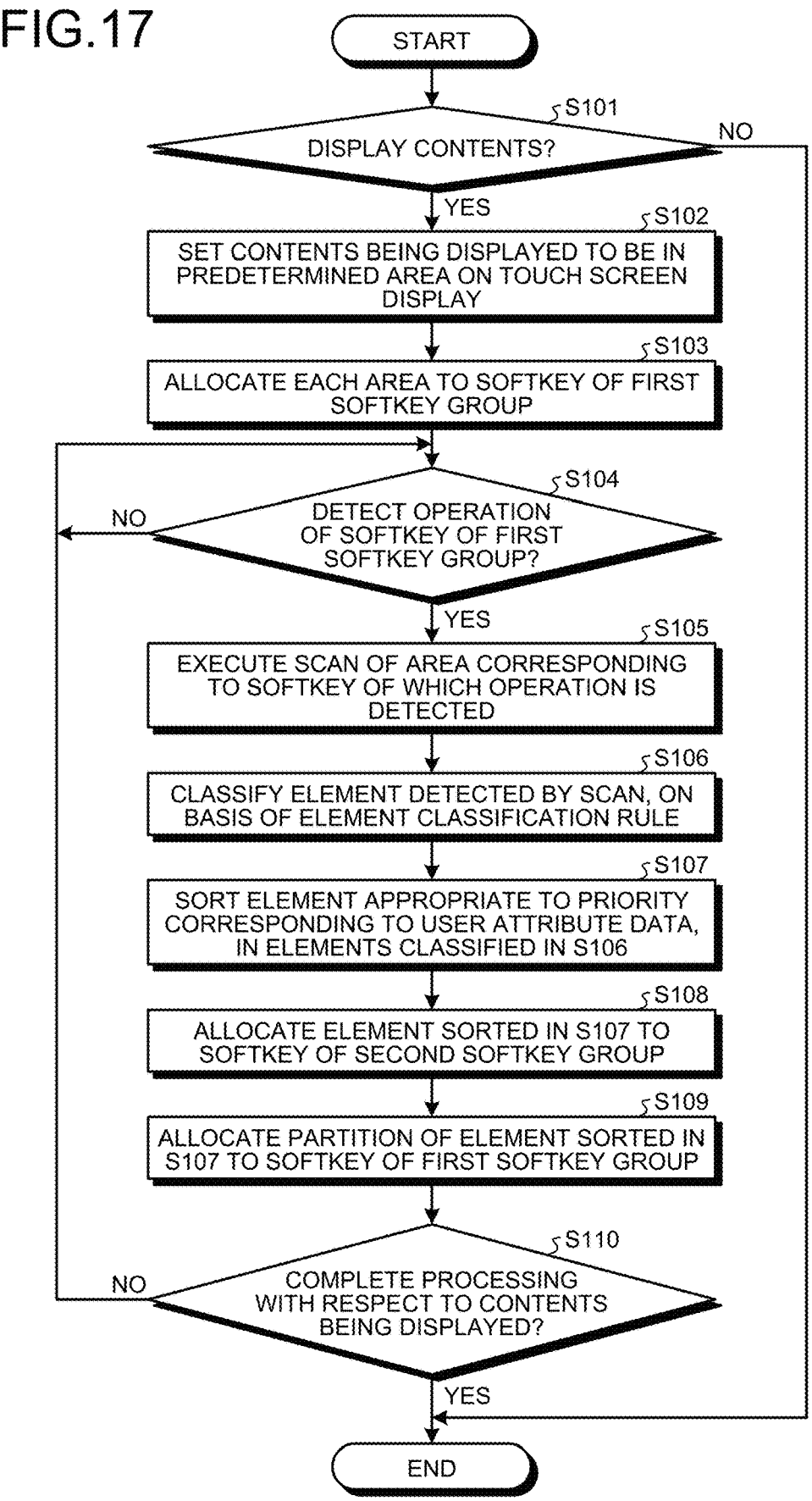
FIG. 17 is a flowchart illustrating an example of a processing flow of the electronic device according to some embodiments.
Figure 18:
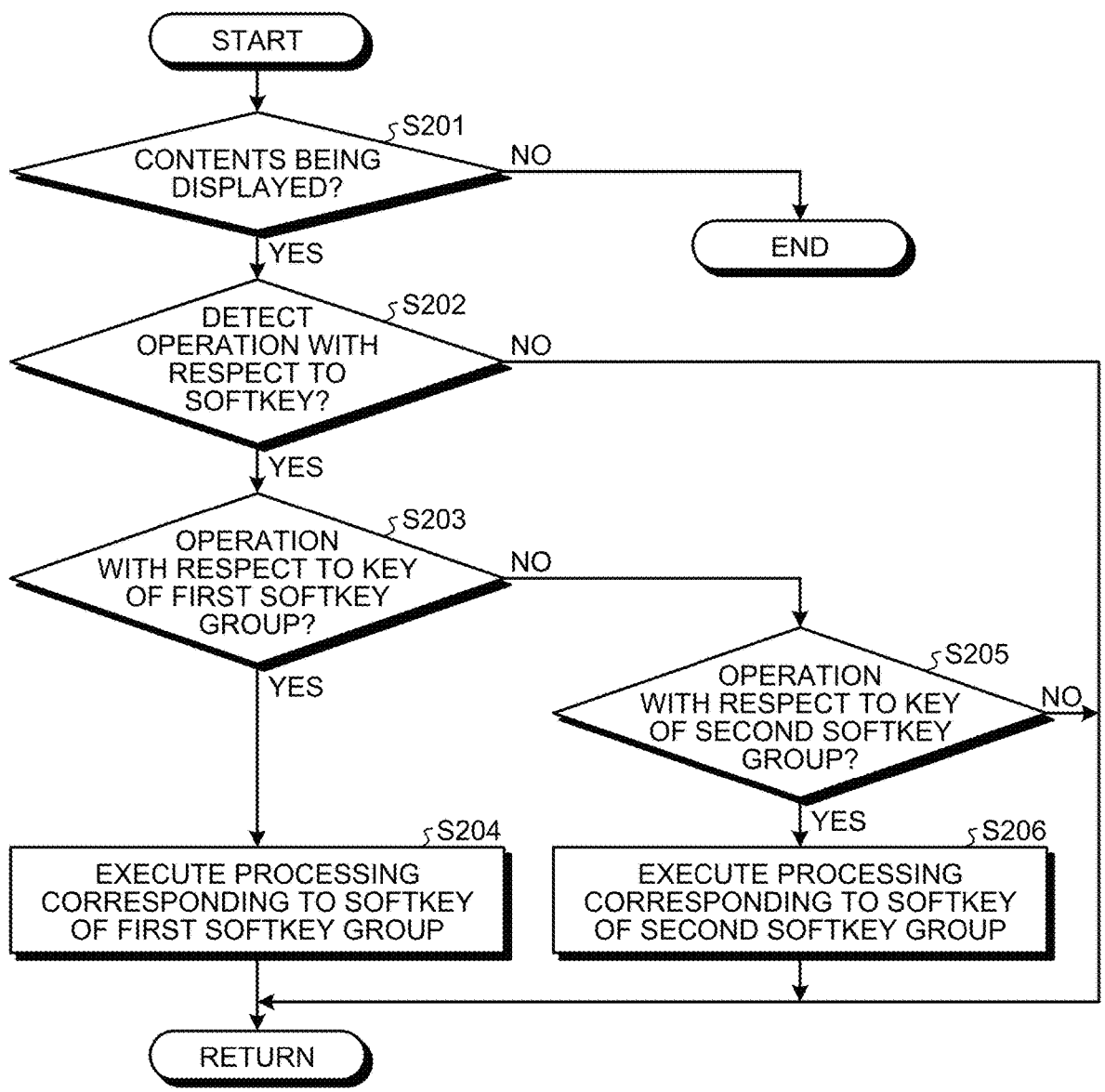
FIG. 18 is a flowchart illustrating an example of the processing flow of the electronic device according to some embodiments.

A processing flow of the electronic device 1 according to some embodiments will be described by using FIGS. 17 and 18. FIGS. 17 and 18 are flowcharts illustrating an example of the processing flow of the electronic device according to some embodiments. The processing illustrated in FIGS. 17 and 18 is realized by allowing the controller 10 to execute the control program 9A.

The processing relevant to the allocation of the element of the contents with respect to the softkey (refer to FIGS. 6 to 12) will be described by using FIG. 17. As illustrated in FIG. 17, the controller 10 determines whether or not the contents are displayed on the touch screen display 2 (Step S101).

As a result of the determination, in a case where the contents are displayed (Step S101, Yes), the controller 10 sets the contents being displayed to be in a predetermined area on the touch screen display 2 (Step S102).

The controller 10 allocates each area to the softkey of the first softkey group G1 (Step S103).

The controller 10 determines whether or not an operation with respect to the softkey of the first softkey group G1 is detected (Step S104).

As a result of the determination, in a case where the operation with respect to the softkey of the first softkey group G1 is detected (Step S104, Yes), the controller 10 executes a scan of an area corresponding to the softkey of which the operation is detected (Step S105).

The controller 10 classifies the element which is detected by the scan, on the basis of the element classification rule 9D (Step S106).

The controller 10 sorts an element appropriate to the priority corresponding to the user attribute data, in the elements classified in Step S106, with reference to the user attribute data and the user attribute-corresponding priority table 9E (Step S107).

The controller 10 allocates the element sorted in Step S107 to the softkey of the second softkey group G2 (Step S108).

The controller 10 allocates a partition of the element sorted in Step S107 to the softkey of the first softkey group G1 (Step S109).

The controller 10 determines whether or not the processing with respect to the contents being displayed is completed (Step S110).

As a result of the determination, in a case where the processing with respect to the contents being displayed is completed (Step S110, Yes), the controller 10 ends the processing illustrated in FIG. 17.

On the other hand, as a result of the determination, in a case where the processing with respect to the contents being displayed is not completed (Step S110, No), the controller 10 is returned to the determination of Step S104 described above.

In Step S104 described above, as a result of the determination, in a case where the operation with respect to the softkey of the first softkey group G1 is not detected (Step S104, No), the controller 10 repeats the same determination.

In Step S101 described above, as a result of the determination, in a case where the contents are not displayed (Step S101, No), the controller 10 ends the processing illustrated in FIG. 17.

As described above, the electronic device 1 according to some embodiments is capable of improving the operability of various contents of the web screen, the screen of the application, and the like to be displayed on the touch screen display 2 by modifying the allocation of the element classified from the contents with respect to the softkey according to the user attribute.

The processing which is executed according to the operation detection with respect to the softkey after the allocation of the elements included in the contents with respect to the softkey is completed (refer to FIGS. 13 to 16) will be described by using FIG. 18. As illustrated in FIG. 18, the controller 10 determines whether or not the contents are displayed (Step S201).

As a result of the determination, in a case where the contents are displayed (Step S201, Yes), the controller 10 determines whether or not the operation with respect to the softkey is detected (Step S202).

As a result of the determination, in a case where the operation with respect to the softkey is detected (Step S202, Yes), the controller 10 determines whether or not it is the operation with respect to the softkey of the first softkey group G1 (Step S203).

As a result of the determination, in a case where it is the operation with respect to the softkey of the first softkey group G1 (Step S203, Yes), the controller 10 executes processing corresponding to the softkey of the first softkey group G1 (Step S204), and is returned to the determination of Step S201 described above.

On the other hand, as a result of the determination, in a case where it is not the operation with respect to the softkey of the first softkey group G1 (Step S203, No), the controller 10 determines whether or not it is the operation with respect to the softkey of the second softkey group G2 (Step S205).

As a result of the determination, in a case where it is the operation with respect to the softkey of the second softkey group G2 (Step S205, Yes), the controller 10 executes processing corresponding to the softkey of the second softkey group G2 (Step S206), and is returned to the determination of Step S201 described above.

On the other hand, as a result of the determination, in a case where it is not the operation with respect to the softkey of the second softkey group G2 (Step S205, No), the controller 10 is returned to the determination of Step S201 described above.

In Step S202 described above, as a result of the determination, in a case where the operation with respect to the softkey is not detected (Step S202, No), the controller 10 is returned to the determination of Step S201 described above.

In Step S201 described above, as a result of the determination, in a case where the contents are not displayed (Step S201, No), the controller 10 ends the processing illustrated in FIG. 18.

In embodiments described above, an example in which the electronic device 1 performs the reduced display with respect to the web screen C1 on the touch screen display 2, and then, displays the softkey interface, has been described, but embodiments are not limited thereto. For example, in the electronic device 1, the web screen C1 may not be subjected to the reduced display, but the softkey interface may be subjected to overlay display with respect to the web screen C1. When the softkey interface is subjected to the overlay display with respect to the web screen C1, transmissivity of the softkey interface may be arbitrarily set.

OTHER EMBODIMENTS

In embodiments described above, an example in which the electronic device 1 sets the contents to be displayed on the touch screen display 2 to be in a predetermined area on the touch screen display 2, and then, classifies the elements of the contents, sorts the classified elements according to the user attribute, and executes the allocation of the sorted element with respect to the softkey, has been described, but embodiments are not limited thereto. For example, the electronic device 1 may execute the allocation of the element classified from the contents with respect to the softkey without setting the contents to be in a predetermined area on the touch screen display 2.

The control program 9A, for example, provides a function for realizing processing of classifying the elements included in the contents to be displayed on the touch screen display 2 on the basis of the element classification rule 9D, without setting the contents to be in a predetermined area on the touch screen display 2, of sorting the classified element on the basis of the user attribute, and of allocating the sorted element to one or a plurality of softkeys. Then, the controller 10 realizes processing of classifying the elements included in the contents to be displayed on the touch screen display 2 on the basis of the element classification rule 9D, of sorting the classified element on the basis of the user attribute, and of allocating the sorted element to one or a plurality of softkeys, by the function provided by the control program 9A.

Figure 19:
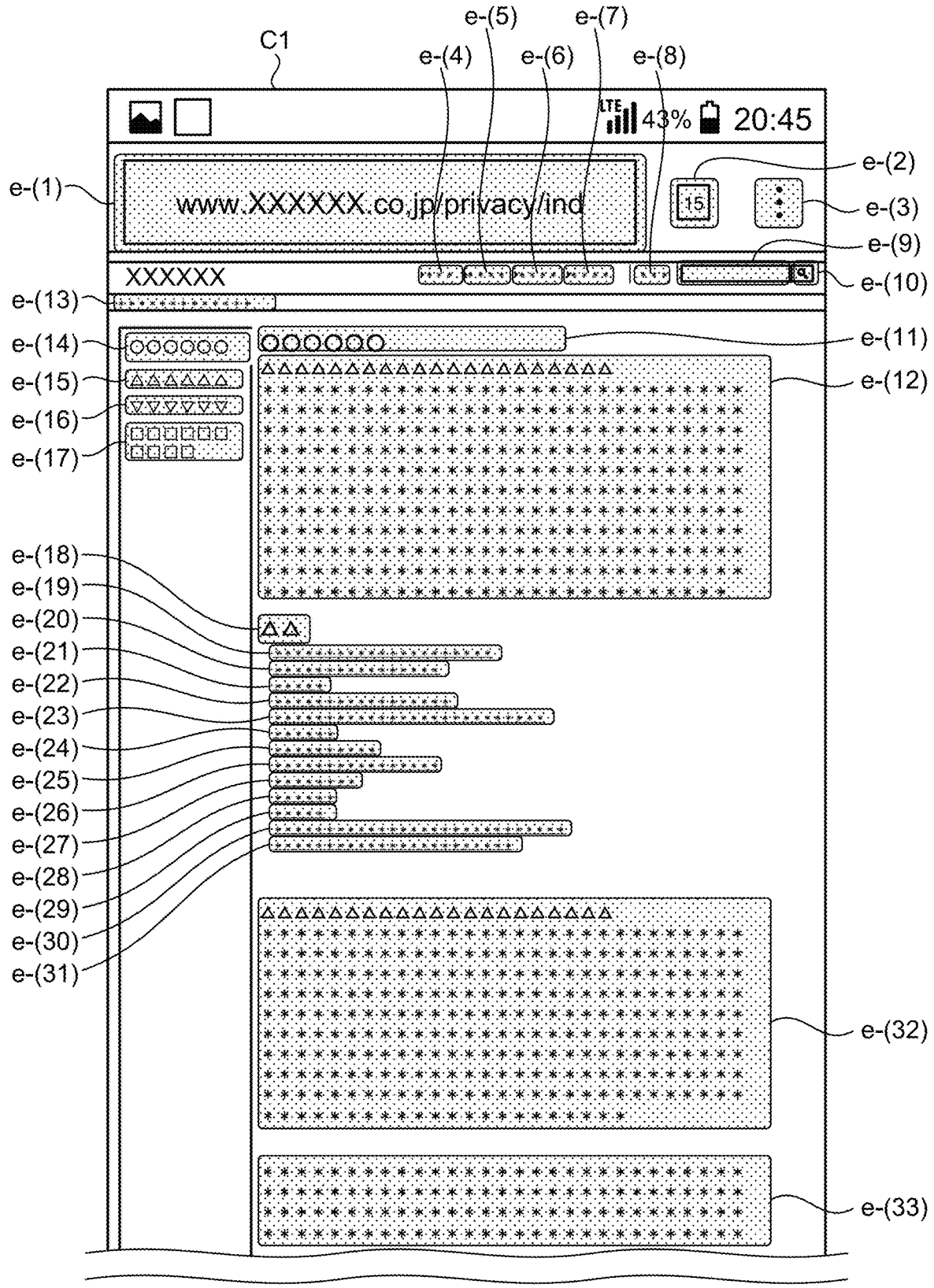
FIG. 19 is a diagram illustrating an example of the entire image of the web screen according to some embodiments.

FIG. 19 is a diagram illustrating an example of the entire image of the web screen according to some embodiments. For example, as illustrated in FIG. 19, the electronic device 1 may scan over the entire surface of the contents to be displayed on the touch screen display 2 (for example, the web screen C1), may classify elements which are an allocation target from the web screen C1 to the softkey (for example, an element e-(1) to an element e-(33)), may sort the classified elements on the basis of the user attribute, and may execute the allocation of the sorted element with respect to the softkey. Hereinafter, a processing flow in a case where the contents are not set to be in a predetermined area on the touch screen display 2, will be described by using FIG. 20.

Figure 20:
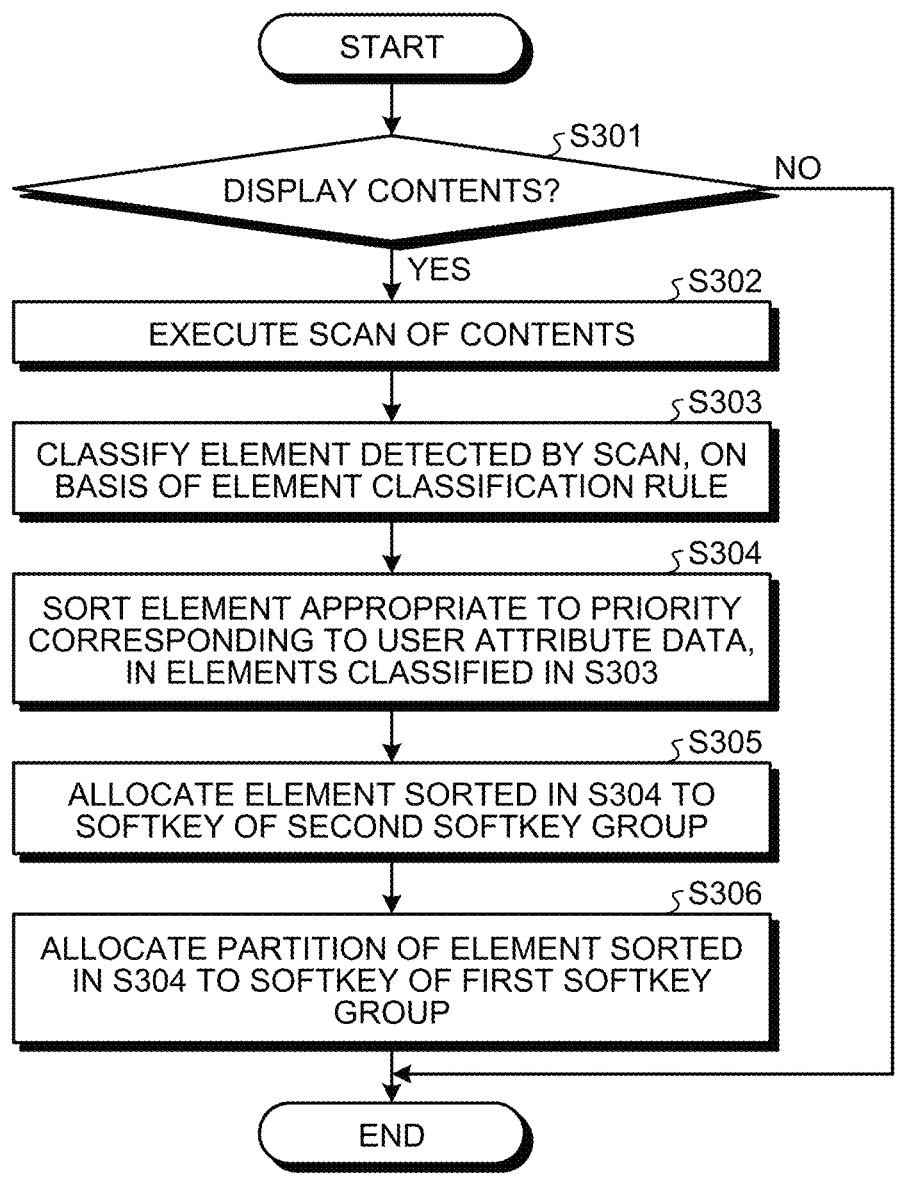
FIG. 20 is a flowchart illustrating another example of the processing flow of the electronic device according to some embodiments.

FIG. 20 is a flowchart illustrating another example of the processing flow of the electronic device 1 according to some embodiments.

As illustrated in FIG. 20, the controller 10 determines whether or not the contents are displayed on the touch screen display 2 (Step S301).

As a result of the determination, in a case where the contents are displayed (Step S301, Yes), the controller 10 executes a scan of the contents (Step S302).

The controller 10 classifies the element which is detected by the scan, on the basis of the element classification rule 9D (Step S303).

The controller 10 sorts an element appropriate to the priority corresponding to the user attribute data, in the elements classified in Step S303, with reference to the user attribute data and the user attribute-corresponding priority table 9E (Step S304).

The controller 10 allocates the element sorted in Step S304 to the softkey of the second softkey group G2 (Step S305).

The controller 10 allocates a partition of the element sorted in Step S304 to the softkey of the first softkey group G1 (Step S306), and ends the processing illustrated in FIG. 20.

In Step S301 described above, as a result of the determination, in a case where the contents are not displayed (Step S301, No), the controller 10 ends the processing illustrated in FIG. 20.

In the processing illustrated in FIG. 20, in a case where the contents are displayed on the touch screen display 2, the electronic device 1 realizes processing of classifying the elements included in the contents to be displayed on the touch screen display 2 on the basis of the element classification rule 9D, of sorting the classified element on the basis of the user attribute, and of allocating the sorted element to one or a plurality of softkeys. Accordingly, in the processing illustrated in FIG. 20, as with the processing illustrated in FIG. 17, it is not necessary to set the contents to be in a predetermined area on the touch screen display 2, nor to detect the operation with respect to the area where the contents are set, and thus, it is possible to complete the entire allocation of the elements included in the contents with respect to the softkey at a timing when the contents are displayed on the touch screen display 2, and it is possible to further improve user convenience, compared to the processing illustrated in FIG. 17.

As described above, the electronic device 1 executes the scan with respect to the web screen C1 displayed on the touch screen display 2, classifies the elements included in the web screen C1, sorts the classified element, and executes the allocation of the sorted element with respect to the softkey, but embodiments are not limited thereto. For example, when the web screen C1 is displayed on the touch screen display 2, the electronic device 1 executes source code analysis of a web page, which is the source of the web screen C1, and thus, may automatically classify the elements included in the web screen C1 on the basis of the element classification rule 9D, and then, may sort the classified element, and may execute the allocation of the sorted element with respect to the softkey. That is, even in a case where the contents are not displayed on the touch screen display 2, the electronic device 1 is capable of classifying and sorting the elements included in the contents, and of allocating the element to the softkey, insofar as there is a method of extracting the element of the contents, as with the source code analysis of the web page.

The outline of the allocation with respect to a softkey corresponding to the screen of the application according to some embodiments will be described by using FIGS. 21 to 28.

Figure 21:
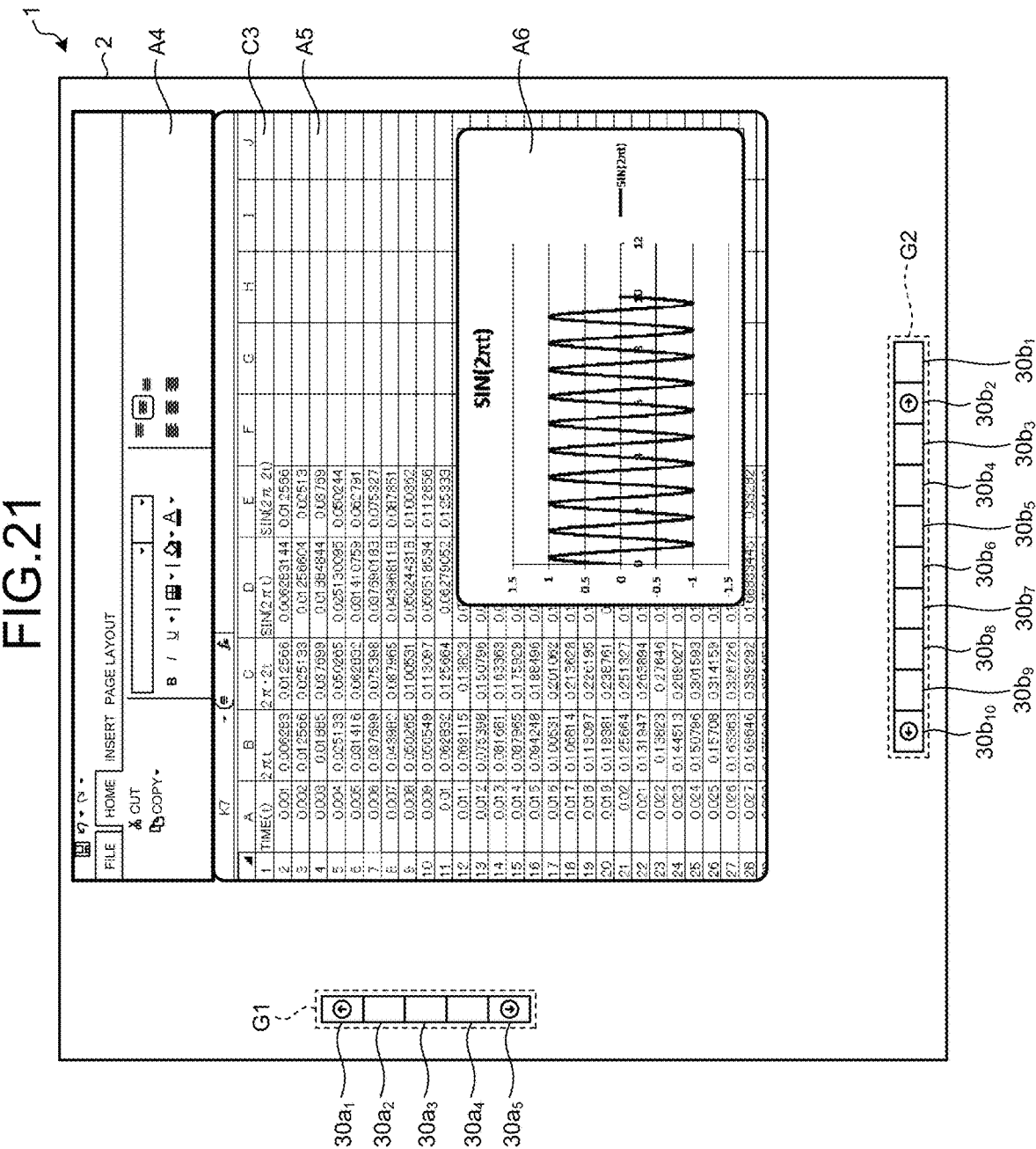
FIG. 21 is a diagram illustrating an outline of allocation of elements included in a table calculation screen with respect to a softkey, according to some embodiments.

The outline of the allocation of the elements included in the table calculation screen with respect to the softkey will be described by using FIGS. 21 to 24. FIGS. 21 to 24 are diagrams illustrating the outline of the allocation of the elements included in the table calculation screen with respect to the softkey according to some embodiments. Also, in the case of performing the allocation of the elements included in the table calculation screen displayed on the touch screen display 2 with respect to the softkey is basically identical to the allocation of the elements included in the web screen C1 exemplified in FIGS. 6 to 12 with respect to the softkey. That is, as illustrated in FIG. 21, the electronic device 1 sets a table calculation screen C3 to be in areas A4, A5, and A6 on the touch screen display 2. The electronic device 1 allocates the area A4 to the softkey $30a_2$ of the first softkey group G1, allocates the area A5 to the softkey $30a_3$ of the first softkey group G1, and allocates the area A6 to the softkey $30a_4$ of the first softkey group G1.

Figure 22:
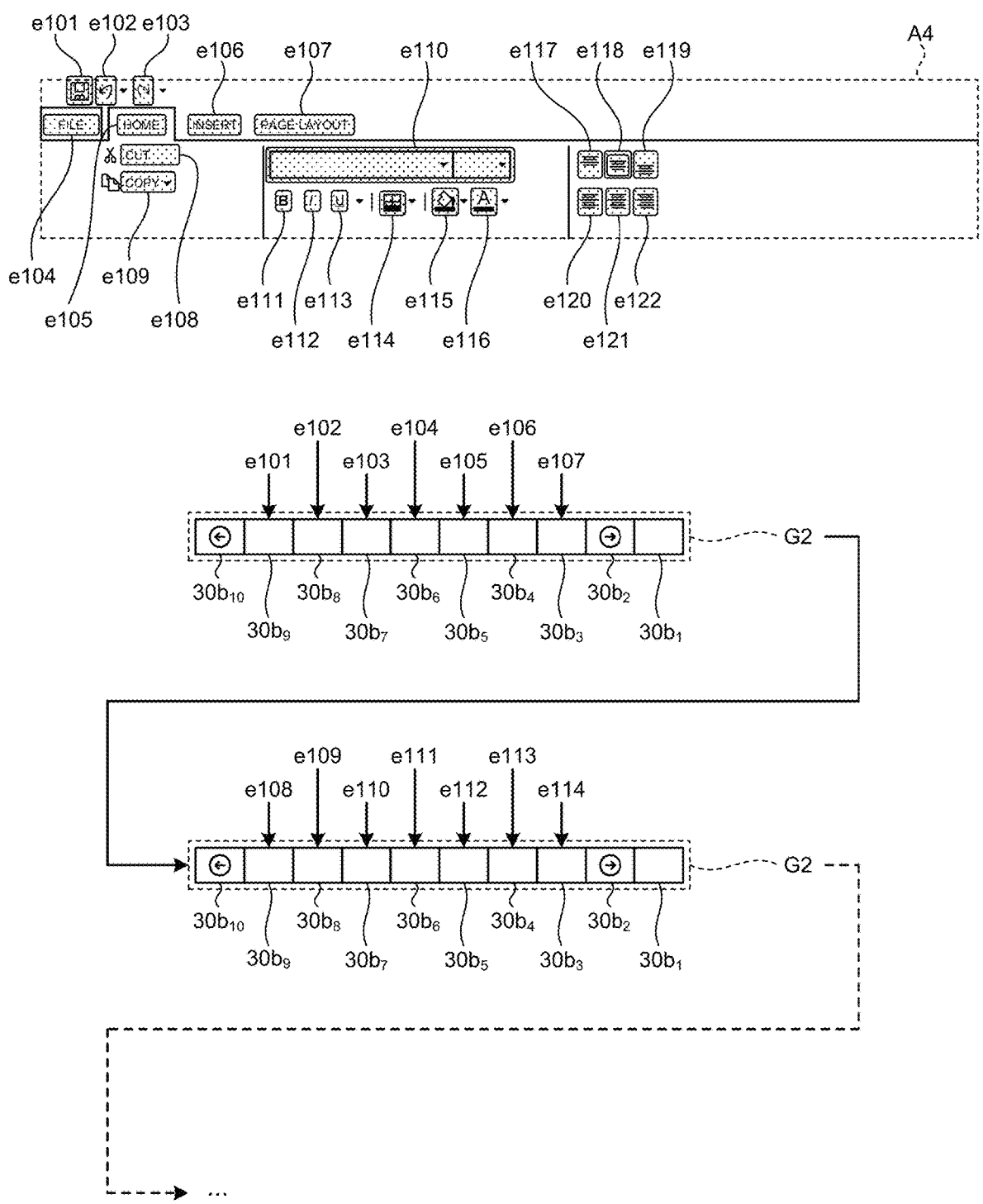
FIG. 22 is a diagram illustrating the outline of the allocation of the elements included in the table calculation screen with respect to the softkey, according to some embodiments.

For example, in the case of receiving the operation of the softkey $30a_2$ to which the area A4 corresponding to a menu of the table calculation screen C3 is allocated, as illustrated in FIG. 22, the electronic device 1 classifies elements of the table calculation screen C3 included in the area A4 on the basis of the element classification rule 9D. That is, the electronic device 1 executes classification relevant to a menu part included in the table calculation screen C3. In the example illustrated in FIG. 22, an element e101 to an element e122 are classified, as the element of the table calculation screen C3 included in the area A4. Subsequently, the electronic device 1 sorts an element appropriate to the priority corresponding to the user attribute data, in the classified element e101 to element e122, with reference to the user attribute data and the user attribute-corresponding priority table 9E. For example, in a case where the elements e101 to e122 are sorted, the electronic device 1 allocates each of the sorted elements to the softkey included in the second softkey group G2 such that the element e101 is allocated to the softkey $30b_9$ included in the second softkey group G2, and the element e102 is allocated to the softkey $30b_8$ included in the second softkey group G2.

Figure 23:
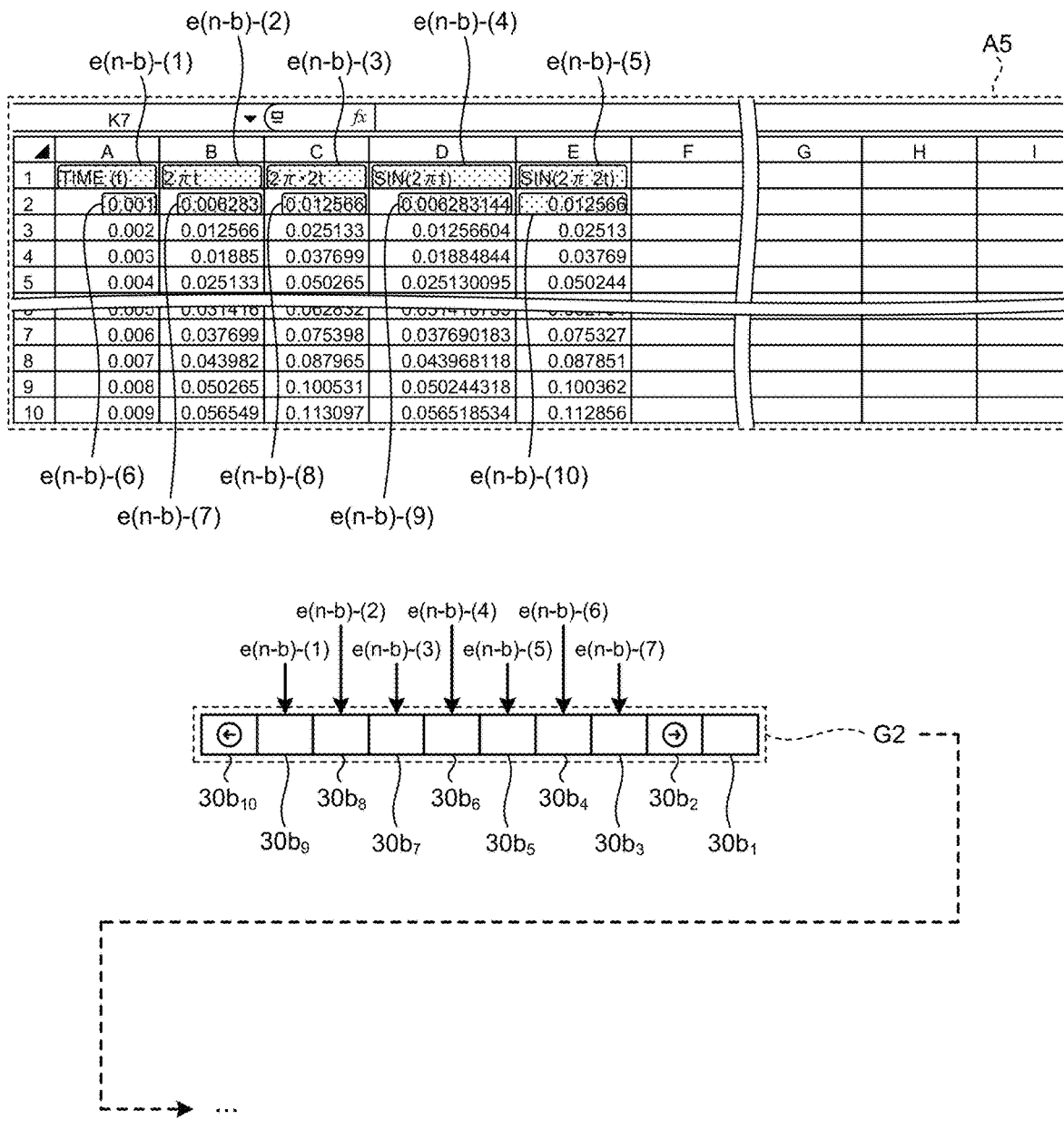
FIG. 23 is a diagram illustrating the outline of the allocation of the elements included in the table calculation screen with respect to the softkey, according to some embodiments.

For example, in the case of receiving the operation of the softkey $30a_3$ to which the area A5 corresponding to a worksheet of the table calculation screen C3 is allocated, as illustrated in FIG. 23, the electronic device 1 classifies the elements of the table calculation screen C3 included in the area A5, on the basis of the element classification rule 9D. That is, the electronic device 1 executes classification relevant to the worksheet included in the table calculation screen C3. In the example illustrated in FIG. 23, for example, elements of an element e(n-b)-(1) to an element e(n-b)-(10) are classified, as a part of the elements of the table calculation screen C3 included in the area A5. Subsequently, the electronic device 1, for example, sorts an element appropriate to the priority corresponding to the user attribute data, in the elements of the element e(n-b)-(1) to the element e(n-b)-(10), with reference to the user attribute data and the user attribute-corresponding priority table 9E. For example, in a case where the elements of the element e(n-b)-(1) to the element e(n-b)-(10) are sorted, the electronic device 1 allocates each of the sorted elements to the softkey included in the second softkey group G2 such that the element e(n-b)-(1) is allocated to the softkey $30b_9$ included in the second softkey group G2, and the element e(n-b)-(2) is allocated to the softkey $30b_8$ included in the second softkey group G2.

For example, in the case of receiving the operation of the softkey $30a_4$ to which the area A6 corresponding to a graph of the table calculation screen C3 is allocated, as illustrated in FIG. 24, the electronic device 1 classifies the elements of the table calculation screen C3 included in the area A6, on the basis of the element classification rule 9D. That is, the electronic device 1 executes classification relevant to a graphic chart included in the table calculation screen C3. In the example illustrated in FIG. 24, an element en-(1) and an element en-(2) are classified, as the element of the table calculation screen C3 included in the area A6. Subsequently, the electronic device 1 sorts an element appropriate to the priority corresponding to the user attribute data, in the classified element en-(1) and element en-(2), with reference to the user attribute data and the user attribute-corresponding priority table 9E. For example, in a case where the element en-(1) and the element en-(2) are sorted, the electronic device 1 allocates the element en-(1) to the softkey $30a_9$ included in the second softkey group G2, and allocates the element en-(2) to the softkey $30b_8$ included in the second softkey group G2.

Figure 26:
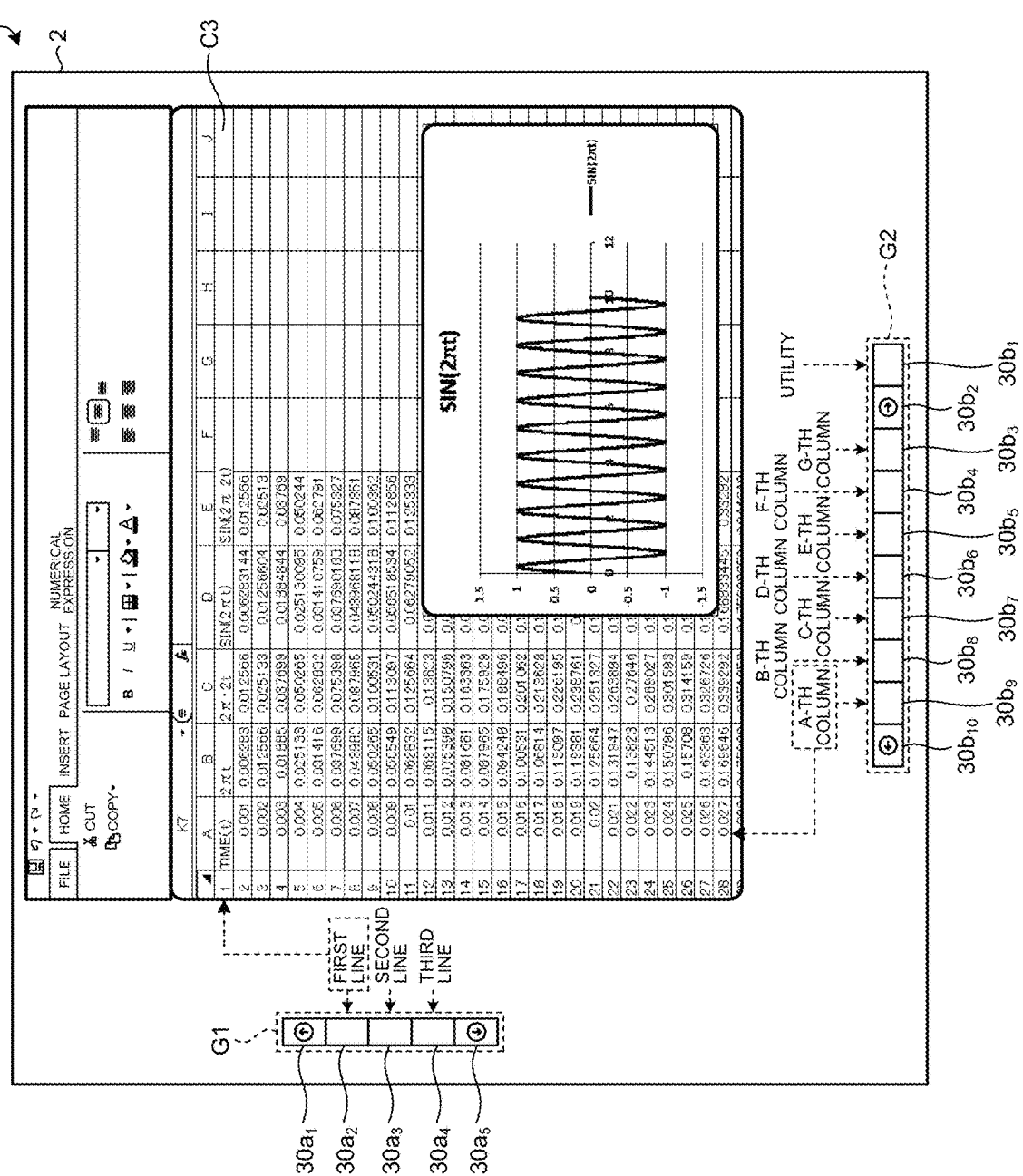
FIG. 26 is a diagram illustrating a correspondence relationship between a softkey and an allocation element according to some embodiments.

FIG. 25 is a diagram illustrating another example of the key data 9C according to some embodiments. FIG. 26 is a diagram illustrating a correspondence relationship between the softkey and the allocation element according to some embodiments. When the allocation illustrated in FIGS. 21 to 24 is executed, as illustrated in FIG. 25, the electronic device 1 records data relevant to the allocation in the key data 9C such that a correspondence relationship between the softkey and the element allocated to the softkey is understood. In the example illustrated in FIG. 25, in an n-a round (a is a natural number) of Allocation Partition/Element, a line (1), a line (2), and a line (3) are allocated to the softkey $30a_2$, the softkey $30a_3$, and the softkey $30a_4$ of the first softkey group G1. In the example illustrated in FIG. 25, in the n-a round (a is a natural number) of Allocation Partition/Element, a column (A) to a column (G) are allocated to the softkey $30b_9$ to the softkey $30b_3$ of the second softkey group G2. For example, as illustrated in FIG. 26, the line (1) indicates the first line of each of lines arranged on the worksheet, and as illustrated in FIG. 26, the column (A) indicates A-th column in each of columns arranged on the worksheet. Thus, in the table calculation screen C3, in consideration of operability of the worksheet, each of the lines on the worksheet may be allocated to the softkey of the first softkey group G1, and each of the columns on the worksheet may be allocated to the softkey of the second softkey group G2.

FIG. 27 is a diagram illustrating another example of the operation of the electronic device according to some embodiments. FIG. 27 illustrates an operation executed by the electronic device 1 according to the operation with respect to the softkey when the softkey is operated by the user after the allocation of the elements included in the table calculation screen C3 with respect to the softkey, of which the outline is described by using FIGS. 21 to 26, is ended.

As illustrated in FIG. 27, in the case of detecting an operation with respect to the softkey $30a_5$ to which the function of "proceed one step" is allocated, in the softkeys of the first softkey group G1, the electronic device 1 changes the element allocated to the softkey of the first softkey group G1 from the element in the first round to the element in the second round (Step S51).

In the case of detecting an operation with respect to the softkey $30a_2$ to which the element of "text" is allocated, in the softkeys of the first softkey group G1, the electronic device 1 transitions an in-cell text included in the worksheet to a state where an operation can be performed by the softkey of the second softkey group G2 (Step S52).

In the case of detecting an operation with respect to the softkey $30b_9$ of the second softkey group G2, the electronic device 1 outputs a sound M11 reading out the contents described on the in-cell text ("time (t)"), which is the element allocated to the softkey $30b_9$ (Step S53).

In the case of detecting an operation with respect to the softkey $30b_8$ of the second softkey group G2, the electronic device 1 outputs a sound M12 reading out the contents described on the in-cell text ("$2\pi t$"), which is the element allocated to the softkey $30b_8$ (Step S54).

FIG. 28 is a diagram illustrating the outline of the allocation of the elements included in the document editing screen with respect to the softkey according to some embodiments. The case of the allocation of the elements included in the document editing screen displayed on the touch screen display 2 with respect to the softkey, is basically identical to the case of the web screen C1 (FIGS. 6 to 12) and the case of the table calculation screen C3 (FIGS. 21 to 24). That is, as illustrated in FIG. 28, the electronic device 1 sets a document editing screen C4 to be displayed on the touch screen display 2 to be in areas A7, A8, and A9 on the touch screen display 2. The electronic device 1 allocates the area A7 to the softkey $30a_2$ of the first softkey group G1, allocates the area A8 to the softkey $30a_3$ of the first softkey group G1, and allocates the area A9 to the softkey $30a_4$ of the first softkey group G1. The detailed description is omitted, but the electronic device 1 classifies elements of the document editing screen C4 included in each of the areas A7, A8, and A9 on the basis of the element classification rule 9D, sorts the classified element on the basis of the user attribute data, and allocates the sorted element to the softkey of the second softkey group G2.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device, comprising:
    a touch screen configured to display;
        a plurality of software keys including first and second software key groups, at least one of the first and second software key groups being arranged along an edge of the touch screen, and
        contents in a predetermined area on the touch screen;
    a memory storing (i) a rule that classifies elements included in the contents and (ii) user attribute data; and
    a processor
        allocating the predetermined area displayed on the touch screen to any software key in the first software key group, and
        in response to detection of an operation of said software key in the first software key group,
            classifying the elements displayed on the touch screen and included in the contents on the basis of the rule,
            sorting the classified elements displayed on the touch screen based on a priority corresponding to the user attribute data, and
            allocating the sorted elements displayed on the touch screen to software keys in the second software key group,
        wherein the plurality of software keys in the first and second software key groups are arranged at fixed locations and displayed on the touch screen,
        wherein the processor is configured to (a) set a partition for user selection to be collectively performed with respect to each element of the elements sorted based on the priority corresponding to the user attribute data and (b) allocate the set partition to a software key in the first software key group.

2. The electronic device according to claim 1, wherein the touch screen has first and second axes intersecting with each other,
    the first software key group is arranged in a first column along a first edge parallel to the first axis of the touch screen, and
    the second software key group is arranged in a second column along a second edge parallel to the second axis of the touch screen.

3. The electronic device according to claim 1, wherein the rule includes information of the priority of sorting the classified elements and allocating the sorted elements to the software keys in the second software key group.

4. The electronic device according to claim 1, wherein the processor is configured to classify the elements included in the contents displayed on the touch screen by scanning the touch screen along first and second directions on the basis of coordinates of the touch screen.

5. The electronic device according to claim 1, wherein the user attribute data include information of visual acuity of a user.

6. A control method of an electronic device including a touch screen, and a memory storing (i) a rule and (ii) user attribute data, the control method comprising:
    displaying, on the touch screen,
        a plurality of software keys including first and second software key groups, at least one of the first and second software key groups being arranged along an edge of the touch screen, and
        contents in a predetermined area on the touch screen;
    allocating the predetermined area displayed on the touch screen to any software key in the first software key group,
    in response to detection of an operation of said software key in the first software key group,
        classifying the elements displayed on the touch screen and included in the contents on the basis of the rule,
        sorting the classified elements displayed on the touch screen based on a priority corresponding to the user attribute data, and
        allocating the sorted elements displayed on the touch screen to software keys in the second software key group,
    wherein the plurality of software keys in the first and second software key groups are arranged at fixed locations and displayed on the touch screen,
    wherein the processor is configured to (a) set a partition for user selection to be collectively performed with respect to each element of the elements sorted based on the priority corresponding to the user attribute data and (b) allocate the set partition to a software key in the first software key group.

7. The control method according to claim 6, wherein the rule includes information of the priority of sorting the classified elements and allocating the classified elements to the software keys in the second software key group.

8. A non-transitory storage medium that stores a control program for causing, when executed by an electronic device including a touch screen and a memory storing (i) a rule and (ii) user attribute data, the electronic device to execute:
    displaying, on the touch screen,
        a plurality of software keys including first and second software key groups, at least one of the first and second software key groups being arranged along an edge of the touch screen, and contents in a predetermined area on the touch screen;

allocating the predetermined area displayed on the touch screen to any software key in the first software key group, in response to detection of an operation of said software key in the first software key group, classifying the elements displayed on the touch screen and included in the contents on the basis of the rule, sorting the classified elements displayed on the touch screen based on a priority corresponding to the user attribute data, and allocating the sorted elements displayed on the touch screen to software keys in the second software key group, wherein the plurality of software keys in the first and second software key groups are arranged at fixed locations and displayed on the touch screen, wherein the processor is configured to (a) set a partition for user selection to be collectively performed with respect to each element of the elements sorted based on the priority corresponding to the user attribute data and (b) allocate the set partition to a software key in the first software key group.

9. The non-transitory storage medium according to claim 8, wherein the rule includes information of the priority of sorting the classified elements and allocating the classified elements to the software keys in the second software key group.

* * * * *